(12) United States Patent
Knoll et al.

(10) Patent No.: US 10,701,253 B2
(45) Date of Patent: Jun. 30, 2020

(54) CAMERA SYSTEMS FOR MOTION CAPTURE

(71) Applicant: Lucasfilm Entertainment Company Ltd., San Francisco, CA (US)

(72) Inventors: John Knoll, San Rafael, CA (US); Leandro Estebecorena, San Rafael, CA (US); Stephane Grabli, San Francisco, CA (US); Per Karefelt, London (GB); Pablo Helman, San Rafael, CA (US); John M. Levin, Mill Valley, CA (US)

(73) Assignee: LUCASFILM ENTERTAINMENT COMPANY LTD., San Francisco, CA (US)

( * ) Notice: Subject to any disclaimer, the term of this patent is extended or adjusted under 35 U.S.C. 154(b) by 0 days.

(21) Appl. No.: 16/102,556

(22) Filed: Aug. 13, 2018

(65) Prior Publication Data

US 2019/0124244 A1    Apr. 25, 2019

Related U.S. Application Data

(60) Provisional application No. 62/575,157, filed on Oct. 20, 2017.

(51) Int. Cl.
*H04N 5/225* (2006.01)
*H04N 5/222* (2006.01)
(Continued)

(52) U.S. Cl.
CPC ....... *H04N 5/22541* (2018.08); *G01S 3/7864* (2013.01); *G06K 9/00342* (2013.01);
(Continued)

(58) Field of Classification Search
CPC ......... H04N 5/22541; H04N 2209/048; H04N 5/332; H04N 5/33; H04N 5/272;
(Continued)

(56) References Cited

U.S. PATENT DOCUMENTS 4,797,736 A    1/1989 Kloots et al.
5,023,709 A    6/1991 Kita et al.
(Continued)

FOREIGN PATENT DOCUMENTS

EP    2408193    1/2012
WO    2008040918    4/2008

OTHER PUBLICATIONS

PCT International Application No. PCT/US2018/056762, "International Search Report and Written Opinion", dated Jan. 18, 2019, 13 pages.
(Continued)

*Primary Examiner* — Jason A Flohre
(74) *Attorney, Agent, or Firm* — Kilpatrick Townsend & Stockton LLP

(57) ABSTRACT

Embodiments of the disclosure provide systems and methods for motion capture to generate content (e.g., motion pictures, television programming, videos, etc.). An actor or other performing being can have multiple markers on his or her face that are essentially invisible to the human eye, but that can be clearly captured by camera systems of the present disclosure. Embodiments can capture the performance using two different camera systems, each of which can observe the same performance but capture different images of that performance. For instance, a first camera system can capture the performance within a first light wavelength spectrum (e.g., visible light spectrum), and a second camera system can simultaneously capture the performance in a second light wavelength spectrum different from the first spectrum
(Continued)

(e.g., invisible light spectrum such as the IR light spectrum). The images captured by the first and second camera systems can be combined to generate content.

11 Claims, 10 Drawing Sheets

(51) Int. Cl.
  *H04N 5/33* (2006.01)
  *G06T 7/246* (2017.01)
  *G11B 27/10* (2006.01)
  *H04N 5/247* (2006.01)
  *G11B 27/031* (2006.01)
  *G01S 3/786* (2006.01)
  *G06K 9/00* (2006.01)
  *H04N 5/272* (2006.01)
  *G06T 7/292* (2017.01)
  *G06T 13/40* (2011.01)
  *G06T 7/73* (2017.01)

(52) U.S. Cl.
  CPC ............. *G06T 7/246* (2017.01); *G06T 7/292* (2017.01); *G06T 7/73* (2017.01); *G06T 13/40* (2013.01); *G11B 27/031* (2013.01); *G11B 27/10* (2013.01); *H04N 5/2224* (2013.01); *H04N 5/2253* (2013.01); *H04N 5/2256* (2013.01); *H04N 5/247* (2013.01); *H04N 5/272* (2013.01); *H04N 5/33* (2013.01); *H04N 5/332* (2013.01); *G06T 2207/10016* (2013.01); *G06T 2207/10024* (2013.01); *G06T 2207/10048* (2013.01); *G06T 2207/30196* (2013.01); *G06T 2207/30201* (2013.01); *G06T 2207/30204* (2013.01); *H04N 2209/047* (2013.01); *H04N 2209/048* (2013.01)

(58) Field of Classification Search
  CPC .... H04N 5/247; H04N 5/2256; H04N 5/2224; H04N 5/2253; H04N 2209/047; G11B 27/10; G11B 27/031; G01S 3/7864; G06T 2207/30196; G06T 2207/10024; G06T 2207/10016; G06T 2207/30204; G06T 2207/30201; G06T 2207/10048; G06T 7/246; G06T 7/292; G06T 7/73; G06T 13/40; G06K 9/00335
  See application file for complete search history.

(56) References Cited

U.S. PATENT DOCUMENTS

| | | | |
|---|---|---|---|
| 6,020,892 A | 2/2000 | Dillon | |
| 6,121,953 A | 9/2000 | Walker | |
| 6,578,967 B1 | 6/2003 | Paddock et al. | |
| 7,218,320 B2 | 5/2007 | Gordon et al. | |
| 7,333,113 B2 | 2/2008 | Gordon | |
| 7,358,972 B2 | 4/2008 | Gordon et al. | |
| 7,388,971 B2 | 6/2008 | Rice et al. | |
| 7,401,920 B1 | 7/2008 | Kranz et al. | |
| 2004/0155968 A1 | 8/2004 | Cheatle et al. | |
| 2005/0105772 A1 | 5/2005 | Voronka et al. | |
| 2005/0257748 A1 | 11/2005 | Kriesel et al. | |
| 2006/0071934 A1 | 4/2006 | Sagar et al. | |
| 2006/0146142 A1 | 7/2006 | Arisawa et al. | |
| 2006/0152512 A1* | 7/2006 | Gordon | H04N 5/222 345/475 |
| 2007/0021441 A1 | 1/2007 | Blasco et al. | |
| 2007/0047768 A1 | 3/2007 | Gordon et al. | |
| 2007/0058839 A1 | 3/2007 | Echegaray et al. | |
| 2007/0229660 A1 | 10/2007 | Yamaguchi | |
| 2008/0025569 A1 | 1/2008 | Gordon et al. | |
| 2008/0099682 A1* | 5/2008 | Gordon | H04N 5/262 250/338.4 |
| 2008/0136916 A1 | 6/2008 | Wolff | |
| 2008/0170077 A1* | 7/2008 | Sullivan | G06T 13/40 345/473 |
| 2009/0094046 A1 | 4/2009 | Hyman et al. | |
| 2010/0079466 A1* | 4/2010 | Griffin | G06T 7/285 345/473 |
| 2010/0231692 A1* | 9/2010 | Perlman | H04N 5/2228 348/48 |
| 2011/0025853 A1 | 2/2011 | Richardson | |
| 2011/0102558 A1 | 5/2011 | Moliton et al. | |
| 2011/0110561 A1* | 5/2011 | Havaldar | G06T 13/40 382/103 |
| 2011/0186625 A1* | 8/2011 | Mangione-Smith | C07K 14/70503 235/375 |
| 2012/0274775 A1* | 11/2012 | Reiffel | G06Q 30/0241 348/158 |
| 2014/0170097 A1* | 6/2014 | Shin | C07F 7/1876 424/63 |
| 2016/0120502 A1 | 5/2016 | Sadeghi-Naini et al. | |
| 2016/0234478 A1 | 8/2016 | Griffin | |
| 2016/0286098 A1* | 9/2016 | Rappaport | H04N 5/2251 |
| 2018/0210064 A1 | 7/2018 | Send et al. | |
| 2018/0289444 A1 | 10/2018 | Blair et al. | |
| 2019/0124244 A1 | 4/2019 | Knoll et al. | |

OTHER PUBLICATIONS

U.S. Appl. No. 12/240,907, Final Office Action dated Dec. 29, 2011, 18 pages.
U.S. Appl. No. 15/134,297, Final Office Action dated Jul. 3, 2018, 14 pages.
U.S. Appl. No. 15/134,297, Non-Final Office Action dated Jan. 10, 2018, 13 pages.
European Patent Application No. 09817042.6, Extended European Search Report dated Nov. 27, 2012, 6 pages.
International Application No. PCT/US2009/058820, International Search Report and Written Opinion dated Nov. 20, 2009, 7 pages.
International Application No. PCT/US2009/058824, International Search Report and Written Opinion dated Nov. 20, 2009, 8 pages.
International Application No. PCT/US2009/058848, International Search Report and Written Opinion dated Dec. 2, 2009, 7 pages.
Woodward et al., Low Cost Virtual Face Performance Capture Using Stereo Web Camera, Advances in Image and Video Technology, Second Pacific Rim Symposium, PSIVT, Lecture Notes in Computer Science, vol. 4872, Dec. 17, 2007, pp. 763-776.
U.S. Appl. No. 16/102,536, "Non-Final Office Action", dated Jan. 27, 2020, 10 pages.

\* cited by examiner

CAMERA SYSTEMS FOR MOTION CAPTURE

CROSS REFERENCE TO RELATED APPLICATIONS

The present application is a non-provisional application of and claims the benefit and priority under 35 U.S.C. 119(e) of U.S. Provisional Application No. 62/575,157, filed Oct. 20, 2017 entitled "SYSTEM FOR MOTION CAPTURE," the entire contents of which are incorporated herein by reference for all purposes.

BACKGROUND

Computer animation is the process of generating animated images of objects in a computer environment. In the film industry, computer animation is often used to animate the natural movement of humans for creating realistic characters in a film that have humanoid features and mannerisms. This type of animation is known in the film industry as motion-capture or performance capture. To capture the natural movements of a human, an actor is equipped with a number of markers, and a number of cameras track the positions of the markers in space as the actor moves. This technique allows the actor's movements and expressions to be captured, and the captured movements and expressions can then be manipulated in a digital environment to produce content, e.g., footage for a motion picture.

Such motion capture systems however have shortcomings. For instance, some such systems may include additional equipment and markers that interfere with the performance of the actor. Accordingly, improved systems and methods for motion capture are desired.

SUMMARY

Embodiments provide systems and methods for motion capture to generate content (e.g., motion pictures, television programming, videos, etc.). In some embodiments, an actor or other performing being can have multiple markers on his or her face that are essentially invisible to the human eye, but that can be clearly captured by camera systems of the present disclosure. Embodiments of the disclosure can capture the performance using two different camera systems, each of which can observe the same performance but capture different images of that performance.

For instance, a first camera system can capture the performance within a first light wavelength spectrum (e.g., visible light spectrum), and a second camera system can simultaneously capture the performance in a second light wavelength spectrum different from the first spectrum (e.g., invisible light spectrum such as the IR light spectrum). The images captured by the first and second camera systems can be combined to generate content, such as animated content. Because the markers are invisible to the first camera system but clearly visible to the second camera system, images captured by the first camera system may not need to be significantly edited to remove any markers on the actor's face and can be used for various content production activities, such as generating movement of a digital or animated character. And, images captured by the second camera system can be used to position the head of an actor within a set or stage. Thus, the images can be used directly for generating content without needing to capture two separate performances.

In some embodiments, the first and second camera systems can be standalone cameras or mounted on a movable rig. Thus, these systems eliminate the need for head-mounted cameras for the motion capture of an actor's face. Eliminating the need for head-mounted cameras minimizes actor discomfort and improves actor performance and satisfaction.

In some embodiments, a computer-implemented method of capturing motion with a motion capture system includes emitting first light at wavelengths within a first spectrum towards an actor in a performance area, capturing a first plurality of images of a performance using a first set of one or more cameras operable to capture the first light at wavelengths in the first spectrum, the first plurality of images representing captured emitted first light that has been reflected off of at least one marker applied to the face of the actor, identifying locations of at least one marker applied to the face of the actor by analyzing at least some of the first plurality of images captured by at least one camera from the first set of one or more cameras, generating position and motion data for a digital character based on the identified locations of the at least one marker applied to the face of the actor, capturing a second plurality of images of the performance using a second set of one or more cameras operable to capture second light at wavelengths in a second spectrum different from the first spectrum, the second plurality of images representing at least a portion of a body of the actor and the set surrounding the actor, and generating content based on the generated position and motion data for the digital character and the second plurality of images.

In some additional embodiments, a computer product including a non-transitory computer readable medium storing instructions that when executed control a device including one or more processors. The instructions include emitting light at wavelengths within a first spectrum towards an actor in a performance area, capturing a first plurality of images of a performance using a first set of one or more cameras operable to capture first light at wavelengths in the first spectrum, the first plurality of images representing captured emitted first light that has been reflected off of at least one marker applied to the face of the actor, identifying locations of at least one marker applied to the face of the actor by analyzing at least some of the first plurality of images captured by at least one camera from the first set of one or more cameras, generating position and motion data for a digital character based on the identified locations of the at least one marker applied to the face of the actor, capturing a second plurality of images of the performance using a second set of one or more cameras operable to capture second light at wavelengths in a second spectrum different from the first spectrum, the second plurality of images representing at least a portion of a body of the actor and the performance area, and generating content based on the generated position and motion data for the digital character and the second plurality of images.

In certain embodiments, a computer system for a motion capture system includes one or more processors and memory containing code for instructing the one or more processors to: emit light at wavelengths within a first spectrum towards an actor in a performance area, capture a first plurality of images of a performance using a first set of one or more cameras operable to capture light at wavelengths in the first spectrum, the first plurality of images representing captured emitted light that has been reflected off of at least one marker applied to the face of the actor, identify locations of at least one marker applied to the face of the actor by analyzing at least some of the first plurality of images captured by at least one camera from the first set of one or more cameras, generate position and motion data for a digital character based on the identified locations of the at least one marker applied to the face of the actor, capture a second plurality of images of the performance using a second set of one or more cameras operable to capture light at wavelengths in a second spectrum different from the first spectrum, the second plurality of images representing at least a portion of a body of the actor and the performance area, and generate content based on the generated position and motion data for the digital character and the second plurality of images.

In some embodiments, a system for motion capture includes a first set of one or more cameras operable to capture first light at wavelengths in a first spectrum, the first set of one or more cameras positioned around a performance area to capture a first series of images of an actor during a performance by the actor in the performance area, one or more light sources configured to emit first light at wavelengths in the first spectrum to illuminate at least a portion of the actor during the performance with the first light, and a second set of one or more cameras operable to capture light at wavelengths in a second spectrum different from the first spectrum, the second set of one or more cameras positioned around the performance area to capture a second series of images of the actor during the performance simultaneously with the first set of one or more cameras so that the first and second set of one or more cameras are configured to capture images of the performance at the same time, but the content of the first series of images are different from the second series of images due to the different spectrums of light in which each set of one or more cameras operates.

In some additional embodiments, a system for motion capture includes a plurality of wheels, a frame mounted on the plurality of wheels, the plurality of wheels configured to allow the frame to be carted to different positions around a performance area, a first camera mounted to the frame and operable to capture first light at wavelengths in a first spectrum, and second and third cameras mounted to the frame at specific locations relative to the first camera, the second and third cameras operable to capture second light at wavelengths in a second spectrum different from the first spectrum, the first, second, and third cameras being configured to simultaneously capture images of an actor in the performance area during a performance.

In certain embodiments, a system for motion capture includes a set of one or more witness cameras positioned on stands that holds the set of one or more witness cameras in an elevated positioned around a performance area to capture a first series of images of an actor during a performance by the actor in the performance area, the set of one or more witness cameras being operable to capture first light at wavelengths in a first spectrum, one or more light sources positioned around the performance area and configured to emit first light at wavelengths in the first spectrum to illuminate at least a portion of the actor during the performance with the first light, and a taking camera operable to capture light at wavelengths in a second spectrum different from the first spectrum, the taking camera positioned around the performance area to capture a second series of images of the actor during the performance simultaneously with the first set of one or more cameras so that the taking camera and the set of one or more witness cameras are configured to capture images of the performance at the same time, but the content of the first series of images are different from the second series of images due to the different spectrums of light in which the cameras operate.

A better understanding of the nature and advantages of embodiments of the present disclosure may be gained with reference to the following detailed description and the accompanying drawings.

Figure 1:
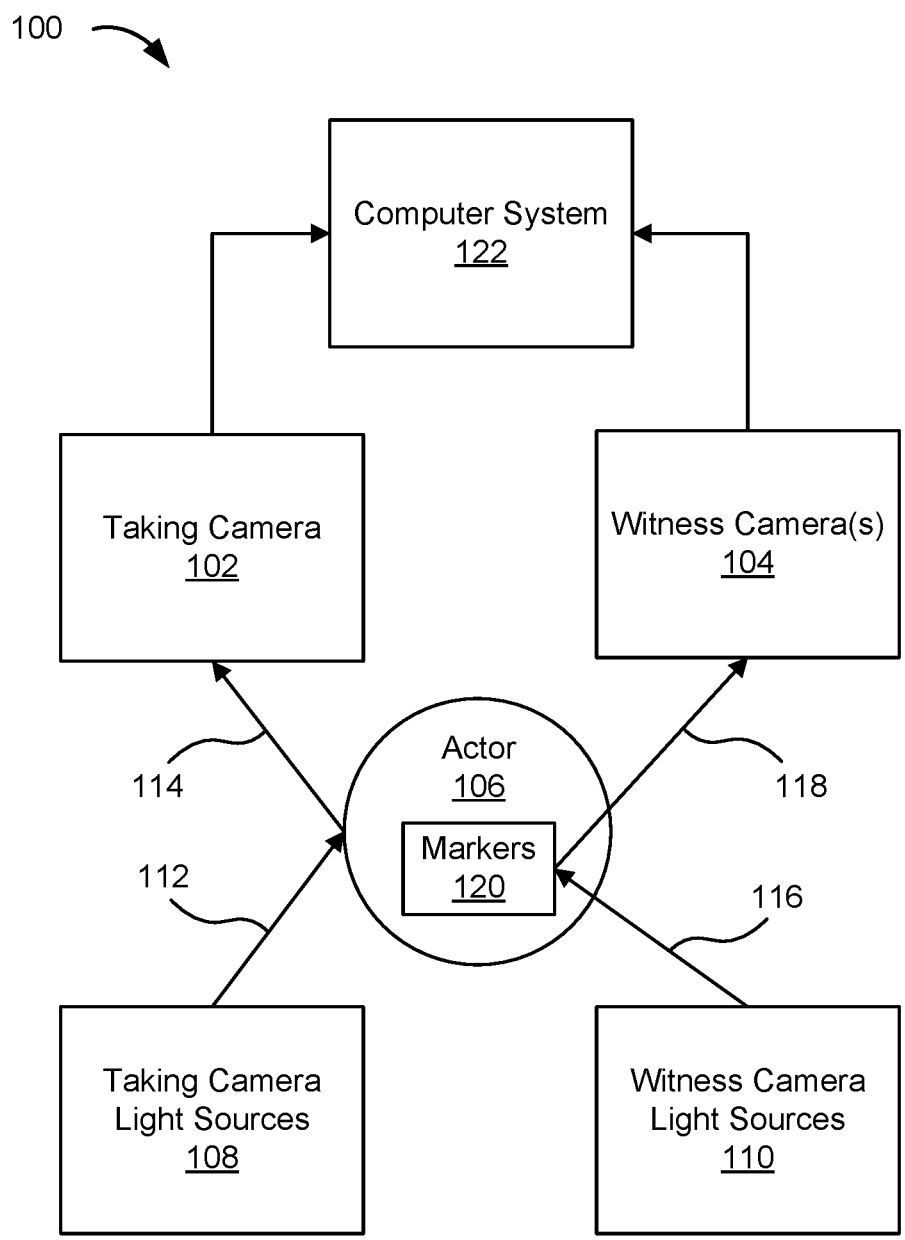
FIG. 1 is a block diagram of an exemplary motion capture system, according to some embodiments of the present disclosure.

The present invention will now be described in detail with reference to certain embodiments thereof as illustrated in the above-referenced drawings. In the following description, numerous specific details are set forth in order to provide a thorough understanding of the present invention. It will be apparent, however, to one skilled in the art, that the present invention may be practiced without some or all of these specific details. In other instances, well known details have not been described in detail in order not to unnecessarily obscure the present invention.

DETAILED DESCRIPTION

Embodiments of the present disclosure describe a motion capture system that includes two types of cameras for generating content. The first type of camera can be a taking camera configured to capture images of an actor in the visible light wavelength spectrum. The second type of camera can be a witness camera configured to capture images of markers on the actor in an invisible light wavelength spectrum, e.g., infrared (IR) light wavelength spectrum. In some embodiments, the markers on the actor are designed to reflect light only in the IR light wavelength spectrum. Thus, the markers may not be visible to the taking camera, but clearly visible to the witness camera(s). It is to be appreciated that the words "visible" and "invisible" used herein are to be interpreted in relation to what is detectable by the naked eye. By being configured to capture light in different spectrums, the taking camera and the one or more witness cameras can simultaneously capture different aspects of a scene based on their respective light wavelengths, thereby eliminating the need to capture two separate performances of the same scene to generate content.

In some embodiments, the witness camera(s) are standalone cameras that are stationary and positioned to capture markers on an actor from one point of view. Each witness camera can be positioned in different locations around a set so that the markers on the actor can be captured from different angles. The taking camera, on the other hand, can be a standalone camera like the witness cameras, but it may not be stationary. For instance, the taking camera can move around the set while the witness camera(s) are stationary. In some additional embodiments, the motion capturing system can be mounted on the same chassis of a single, movable rig. As an example, a motion capturing system can include a taking camera and two witness cameras laterally positioned on opposite sides of the taking camera. All three cameras can be pointing in the same general direction such that all three cameras can capture the same scene but at different angles. By separating taking and witness cameras from an actor's head, the actor can be less distracted during takes and be more comfortable throughout the shoot. Furthermore, mounting the motion capturing system on the same rig allows the entire system to be easily moved around a set.

Details of such motion capture systems will be discussed in detail further herein.

I. Motion Capture System

FIG. 1 is a block diagram of an exemplary motion capture system 100, according to some embodiments of the present disclosure. Motion capture system 100 includes a taking camera 102 and one or more witness cameras 104. Each of taking camera 102 and witness camera(s) 104 can be any suitable image capturing device that can measure light and generate an image based on the measured light. In some embodiments, taking camera 102 is a first type of camera that can measure light in the visible light wavelength spectrum, and witness camera(s) 104 is a second type of camera that can measure light in the invisible light wavelength spectrum, where the visible and invisible light spectrums do not overlap. For example, taking camera 102 can be an RGB camera that can generate images by measuring light at wavelengths between approximately 390 to 700 nm, and witness camera(s) 104 can be two IR cameras that can generate images by measuring light at wavelengths between approximately 701 nm to 1 mm. In some embodiments, the visible and invisible light spectrums do not overlap so that taking camera 102 and witness camera(s) 104 capture different images even though they may be focused on substantially the same object in the area of a set.

In some embodiments, motion capture system 100 includes taking camera light sources 108 and witness camera light sources 110. Each light source can be designed to emit light between a wavelength spectrum that matches the wavelength spectrum of a corresponding camera so that at least some light emitted from the light sources can be captured by respective cameras in system 100 after being reflected off of surfaces of actor 106. For example, taking camera light sources 108 can emit visible light 112 to illuminate actor 106. At least a portion 114 of visible light 112 can reflect off of actor 106 and be captured by taking camera 102. Likewise, witness camera light sources 110 can emit invisible light 116 to illuminate actor 106, and at least a portion 118 of invisible light 116 can reflect off of actor 106 and be captured by taking camera 102. In some embodiments, portion 114 of visible light 112 is reflected off of the face, hair, head, neck, shoulders, or any other body part of actor 106, while portion 118 of invisible light 116 is reflected off of markers 120 on a face of actor 106. In certain embodiments such markers 120 can reflect invisible light but not visible light so that markers 120 are substantially undetectable by taking camera 102. In other embodiments, such markers 120 can be relatively more reflective of invisible light than visible light such that markers 120 are substantially undetectable by taking camera 102.

Operation of motion capture system 100 can be better understood from an exemplary use case scenario. For example, during filming of a motion picture, taking camera 102 can be used to capture the entire composition of a set, e.g. actor 106 looking around at his surroundings in front of a busy street in New York City. Taking camera light sources 108 are flood lights shining white, visible light that illuminates the scene with visible light so that taking camera 102 can capture footage of actor 106 as he or she looks around, as well as any extras walking around the busy street, any building facades around actor 106, and any cars that may pass by actor 106. Meanwhile, witness camera light sources 110 are flood lights shining invisible, IR light that illuminates the scene with IR light so that witness cameras 104 can simultaneously capture footage of markers 120 on the face of actor 106. Markers 120 can be configured as a retro-reflectors that can substantially reflect IR light, as will be discussed further herein. Accordingly, markers 120 may appear as bright dots in the images captured by witness cameras 104.

Because taking camera 102 may be unable to detect IR light, the images captured taking camera 102 may not include portions 118 of reflected IR light from markers 120. As a result, the images captured by taking camera 102 may be used directly in an item of content and/or used to drive a digital replica of actor 106 based on a markerless motion solving system. In some embodiments, markers 120 can be detectable in both visible and invisible light spectrums. For instance, markers 120 can be black dots that are detectable in both visible light and IR light. In such instances, taking camera 102 and witness cameras 104 can both capture the positions of markers 120, thereby enabling a more robust triangulation of the face of actor 106 during the performance.

By having two types of cameras 102 and 104 and two respective light sources 108 and 110, motion capture system 100 can effectively and efficiently capture two different motion picture compositions with one shoot, i.e., act of filming. Thus, motion capture system 100 enables the generation of content using a minimal number of performances by actor 106. More specifically, actor 106 only needs to perform a single performance in order (1) to generate images directly usable for an item of content and/or driving a digital character in a virtual environment and (2) for accurately determining the location of a digital character mapped to the head of actor 106 in a virtual environment.

Based on the images captured from taking camera 102 and witness cameras 104, motion capture system 100 can determine the locations of various parts of the head of actor 106 during a performance. In some embodiments, the captured images from taking camera 102 and witness cameras 104 can be provided to a computer system 122, which can be located at a remote location, such as in an editing studio, or it can be positioned within the near vicinity of cameras 102 and 104. Computer system 122 can be a special-purpose computer system, such as a content generation system, that utilizes the captured images from taking camera 102 and the locations of markers 120 of actor 106 captured by witness cameras 104 to position a digital or virtual head corresponding to the actor's head in a virtual environment or set. The content generation system may then generate content (e.g., a film or TV programming) based on the positioning. For example, continuing from the use case scenario above, computer system 122 can position a digital or virtual face on the actor's head to make him look different while the actor is looking around at his surroundings in front of the busy street in New York City. The images captured by taking camera 102 can be the actor's head, body, and his surroundings, while the images captured by witness cameras 104 can be the positions of markers 120 relative to the actor's head, body, and his surroundings. Thus, the positions of markers 120 can be used to accurately and realistically position the digital or virtual face on the actor's head during the performance. Details of computer system 122 is discussed in further detail herein with respect to FIGS. 9 and 10.

In some embodiments, taking camera 102 and witness cameras 104 in motion capture system 100 can be configured in various different ways. For instance, taking camera 102 and witness cameras 104 can each be standalone cameras where witness cameras 104 are stationary. In another example, motion capture system 100 can be configured so that taking camera 102 and witness cameras 104 are all mounted on a same rig so that the cameras form a single image capturing device. Each of these embodiments will be discussed in detail further herein with respect to FIGS. 2-6B.

A. Stationary Witness Cameras

As mentioned above, a motion capture system can include tracking and witness cameras where the tracking and witness cameras are standalone cameras, and where the witness cameras are also stationary. An exemplary motion capture system with such a configuration is shown in FIG. 2.

Figure 2:
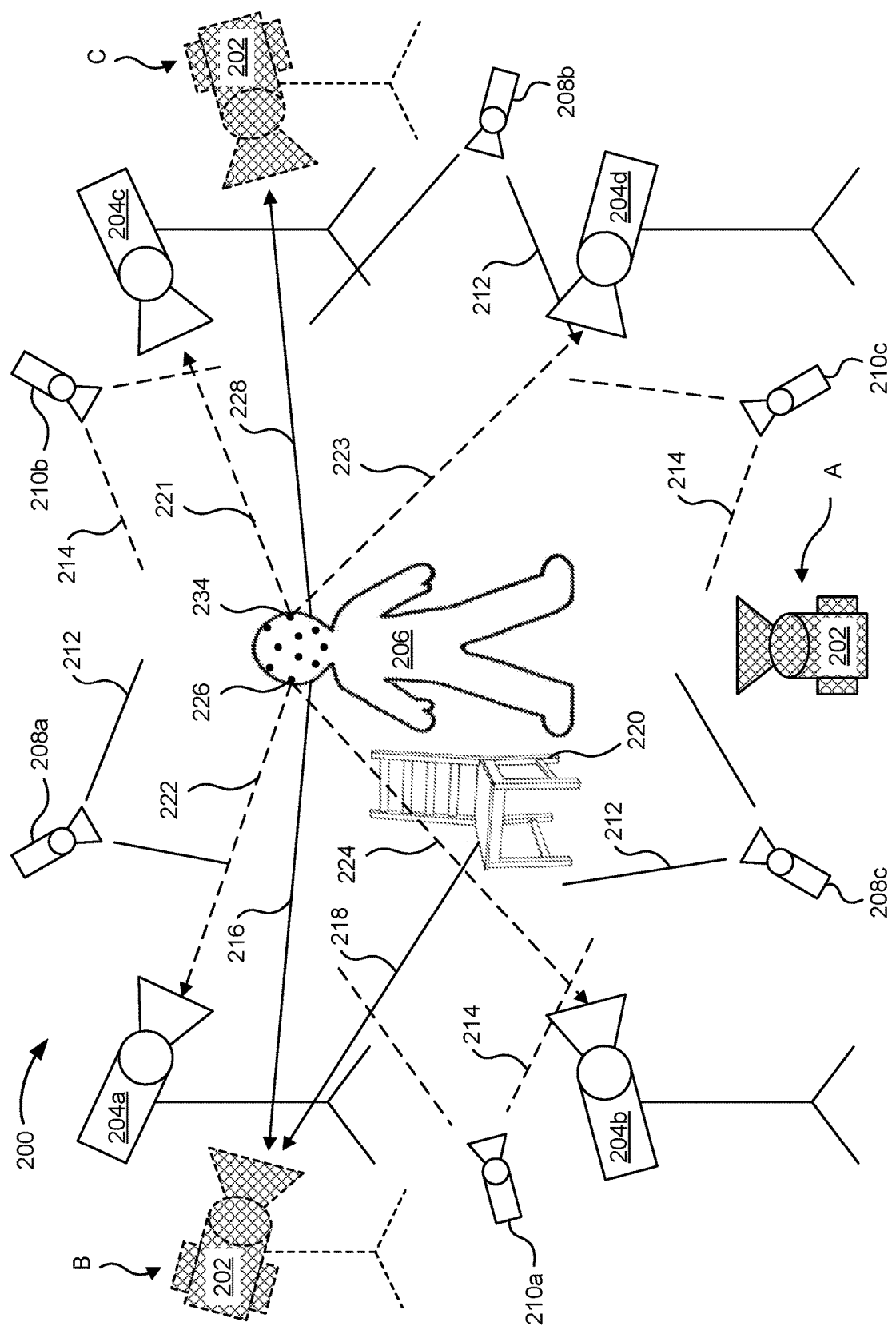
FIG. 2 is a simplified diagram of an exemplary motion capture system configured with a taking camera and stationary witness cameras, according to some embodiments of the present disclosure.

FIG. 2 is a simplified diagram of an exemplary motion capture system 200 configured with a taking camera 202 and stationary witness cameras 204a-d where stationary witness cameras 204a-d are stationary, standalone cameras, according to some embodiments of the present disclosure. Each witness camera 204a-d can be stationary in that they are not easily movable once they are positioned in place and are not intended to be moved during a performance by actor 206. For example, each witness camera 204a-d can rest on stands that fix witness cameras 204a-d in place throughout an entire performance by actor 206. Although system 200 includes four witness cameras 204a-d, it is to be appreciated that embodiments are not limited to such configurations and that other embodiments can have more or less witness cameras.

Taking camera 202, on the other hand, does not have to be stationary and can move around while actor 206 is performing. As an example, taking camera 202 can be mounted on a rail and move between two locations to capture a moving shot of actor 206 during his or her performance. In another example, taking camera 202 can move from point A to point B and then to point C throughout a performance by actor 206. Taking camera 202 is shown with dashed lines in positions B and C is to illustrate that there is one taking camera (instead of three) and that it can move to different positions around actor 206.

According to some embodiments of the present disclosure, taking camera 202 operates to capture light in a first wavelength spectrum, and witness cameras 204a-d operate to capture light in a second wavelength spectrum different from the first wavelength spectrum such that the two spectrums do not overlap. As an example, taking camera 202 can operate to capture visible light (i.e., light at wavelengths between approximately 390 to 700 nm) and witness cameras 204a-d can operate to capture invisible light (i.e., IR light at wavelengths between approximately 701 nm to 1 mm). To prevent overlap in the operable wavelengths of taking camera 202 and witness cameras 204a-d, one or more modifications can be implemented for each respective camera. As an example, IR filters can be implemented in front of the taking lenses for witness cameras 204a-d to only allow IR light to pass through. Additionally, witness cameras 204a-d can be implemented with an IR image sensor that can detect IR light only, or witness cameras 204a-d can be implemented with an image sensor that does not have a coating that filters IR light so that IR light is allowed to be detected by the image sensor. It is to be appreciated that any other modification to separate the operating wavelength spectrums of taking camera 202 and witness cameras 204a-d without departing from the spirit and scope of the present disclosure can be envisioned in embodiments herein.

In certain embodiments, a plurality of light sources can project light against actor 206 to enable and/or improve the quality of images captured by taking camera 202 and witness cameras 204a-d. For instance, motion capture system 200 can include taking camera light sources 208a-c and witness camera light sources 210a-c. In some embodiments, taking camera light sources 208a-c and witness camera light sources 210a-c can emit light in different wavelength spectrums that correspond to the operating wavelengths of respective cameras for which they are configured to provide illumination. As an example, taking camera light sources 208a-c can emit visible light 212 and witness camera light sources 210a-c can emit IR light 214. It is to be appreciated that for outdoor sets during the day, there may be enough ambient visible and IR light from the sun such that taking camera light sources 208a-c and/or witness camera light sources 210a-c may not be needed for taking camera 202 and witness cameras 204a-d to capture images of actor 206. Thus, taking camera light sources 208a-c may be optional in motion capture system 200.

During filming while actor 206 is performing, portions of light 212 and 214 emitted from light sources 208a-c and 210a-c (or from ambient visible and IR light) can reflect back to cameras 202 and 204a-d, which can then simultaneously capture images of actor 206 and/or the actor's surroundings. As an example, a portion 216 of visible light emitted from one or both taking camera light sources 208a and 208c can be reflected off of a face, or the entire body, of actor 206 and be captured by taking camera 202 in position B. In addition to portion 216, a portion 218 of visible light can be reflected off of objects in the set around actor 206, such as a chair 220 (or, from the use case scenario above, building facades, passing cars, or any other type of object found on a busy street in New York City), and also be captured by taking camera 202 in position B. According to some embodiments of the present disclosure, portions 222 and 224 of invisible light emitted from witness camera light source 210a can be reflected off a marker 226 on the face of actor 206 and be captured, simultaneously with the capturing of visible light by taking camera 202, by respective witness cameras 204a and 204b. As can be seen from FIG. 2, witness cameras 204a and 204b can be positioned in different locations around the set and actor 206; thus, witness cameras 204a and 204b can view marker 226 from different angles and distances. The captured images of marker 226 can be utilized by a computer system, e.g., computer system 122 in FIG. 1, to triangulate the position of marker 226 in a three-dimensional environment. The triangulated position of marker 226 can be combined with the footage captured by taking camera 202 to generate accurate digital performances of actor 206 in the set or digital performances of a digital character in a virtual environment. The same can be said for portions 221 and 223 of reflected IR light from marker 234, and portion 228 of reflected visible light from the face of actor 206, when taking camera 202 is at position C, or any other position around actor 206, e.g., position A.

It can be appreciated that implementing more witness cameras in different positions around actor 206 can more reliably capture the movement of actor 206. This is because when actor 206 is performing, some markers may be visible to some witness cameras but appear blocked to other witness cameras. For instance, as shown in FIG. 2, marker 226 may be visible to witness cameras 204a and 204b, but appear blocked to witness cameras 204c and 204d. In other instances, some objects (e.g., a boom mic, filming personnel, and the like) around the set may unintentionally occlude the view of one or more witness cameras. By having more witness cameras around actor 206, there is a greater chance that there will be at least one or more witness cameras that can capture the movement of marker 226 even though one or more witness cameras are occluded. Furthermore, using a greater number of witness cameras can minimize the occurrence where a marker is not visible to any witness camera. In such situations, calculation of the position of marker 226 may not be possible, or the calculation may be based on the captured images from taking camera 202, which may result in an inaccurate determination of the marker's position because of a lack of depth perception. In such embodiments, marker 226, and other markers visible on the face of actor 206, can be visible to taking camera 202 and witness cameras 204a-d. For instance, marker 226 can be a black marker that absorbs visible light and reflects IR light. That way, from the perspective of taking camera 202, marker 226 appears as a block dot; and from the perspective of witness cameras 204a and 204b, marker 226 appears as a bright dot. In some other embodiments, however, marker 226 can be visible to witness cameras 204a-d but invisible to taking camera 202, as will be discussed further herein with respect to FIG. 7.

By implementing two types of cameras, e.g., taking camera 202 and witness cameras 204a-d, that operate to capture light at non-overlapping wavelength spectrums, motion capturing system 200 can effectively and efficiently capture two different video footages with one shoot. Thus, motion capture system 200 enables the generation of content using a minimal number of performances by actor 206. More specifically, actor 206 only needs to perform a single performance in order (1) to generate images directly usable for an item of content and/or driving a digital character in a virtual environment and (2) for accurately determining the location of a digital character mapped to the head of actor 206 in a virtual environment.

B. Non-Stationary Witness Cameras

As can be appreciated by the illustration of FIG. 2, motion capture system 200 includes several standalone components, e.g., taking camera 202 and four witness cameras 204a-d. If the director shooting actor 206 in a set wants to change scenes and set locations, each of the standalone components may need to be moved individually. To simplify this process and enable motion capture system 200 to be more mobile and versatile, the taking camera and witness cameras can be mounted on a single, movable structure so that witness cameras 204a-d are non-stationary, as discussed herein with respect to FIG. 3.

Figure 3:
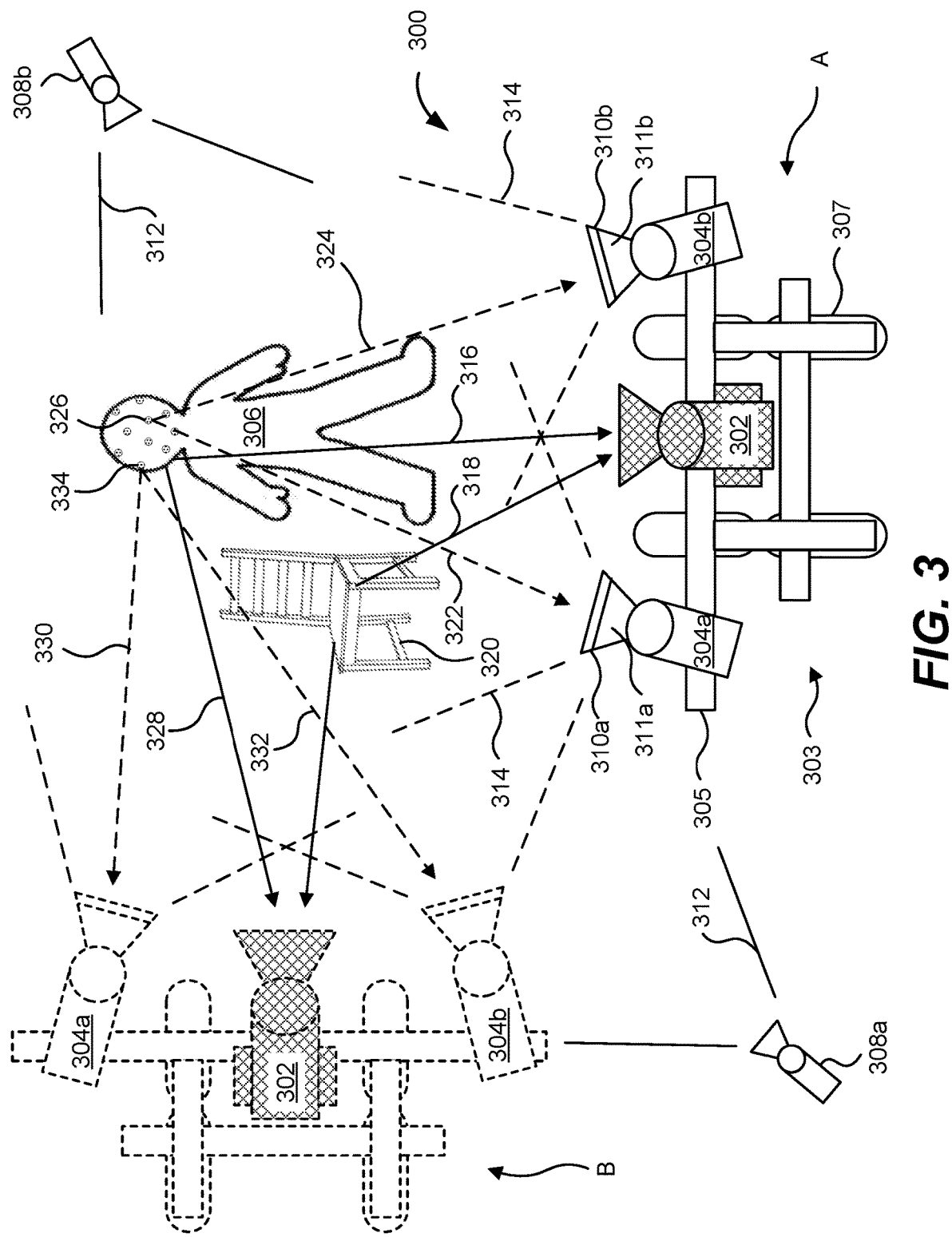
FIG. 3 is a simplified diagram of an exemplary motion capture system configured with a taking camera and two witness cameras, all of which are mounted on a movable rig, according to some embodiments of the present disclosure.

FIG. 3 is a simplified diagram of an exemplary motion capture system 300 configured with a taking camera 302 and two witness cameras 304a-b where taking camera 302 and stationary witness cameras 304a-b are mounted on a movable rig 303, according to some embodiments of the present disclosure. Rig 303 with taking and witness cameras 302 and 304a-b is shown from the top-down perspective. Taking camera 302 and witness cameras 304a-b can be configured to be substantially similar to taking camera 202 and witness cameras 204a-d in FIG. 2. Accordingly, details of taking camera 302 and 304a-b can be referenced in the disclosure of FIG. 2 and are not discussed herein for brevity.

As shown in FIG. 3, taking camera 302 and witness cameras 304a-b can be rigidly mounted on a single structure 305, according to some embodiments of the present disclosure. Structure 305 can be a stiff frame that is part of rig 303 and strong enough to support the weight of cameras 302 and 304a-b, such as a steel frame with bolting points for securing cameras 302 and 304a-b. Additionally, rig 303 can include a set of wheels 307 that enable rig 303, along with taking camera 302 and witness cameras 304, to roll between different positions around actor 306, such as between position A and position B. By being mounted on movable rig 303, witness cameras 304a-b are non-stationary, thereby significantly simplifying the moving process of motion capture system 300, whether it be for moving to different shot angles within a set, or for moving to a completely new set at a different location.

In certain embodiments, motion capture system 300 can include a plurality of light sources for projecting light against actor 306. For instance, motion capture system 300 can include taking camera light sources 308a-b positioned to illuminate actor 306 from different angles. Like taking camera light sources 208a-c in motion capture system 200 of FIG. 2, taking camera light sources 308a-b can be optional standalone light sources. However, unlike witness camera light sources 210a-c in motion capture system 200, witness camera light sources 310a-b can each be a part of a respective witness camera 304a-b. Thus, witness cameras 304a-b can not only capture invisible (IR) light, but they can also illuminate actor 306 with invisible light, thereby reducing the number of standalone components for a motion capture system.

As an example, witness camera light source 310a can be formed as part of, or attached to, a lens hood 311a of witness camera 304a. In some embodiments, witness camera light source 310a is constructed as a ring of light emitters (e.g., light emitting diodes (LEDs)) positioned around a circumference of the front end of lens hood 311a. When constructed as a ring of light emitting diodes, witness camera light source 310a can project invisible (IR) light 314 at actor 306 from the exact angle at which witness camera 304a perceives actor 306. Thus, invisible light 314 cast upon actor 306 may not create any shadows when viewed from the position of witness camera 304a, thereby maximizing illumination efficiency of actor 306 and the brightness of reflected light detected by witness camera 304a. It is to be appreciated that taking camera light sources 308a-b and witness camera light sources 310a-b can be substantially similar in function to taking camera light sources 208a-c and witness camera light sources 210a-b of motion capture system 200 in FIG. 2, and thus have the same function and purpose. i.e., provide visible and invisible light to improve the quality of images captured by taking camera 302 and witness cameras 304a-b. A better understanding of the structure and construction of such a motion capture system can be achieved with reference to FIG. 4.

Figure 4:
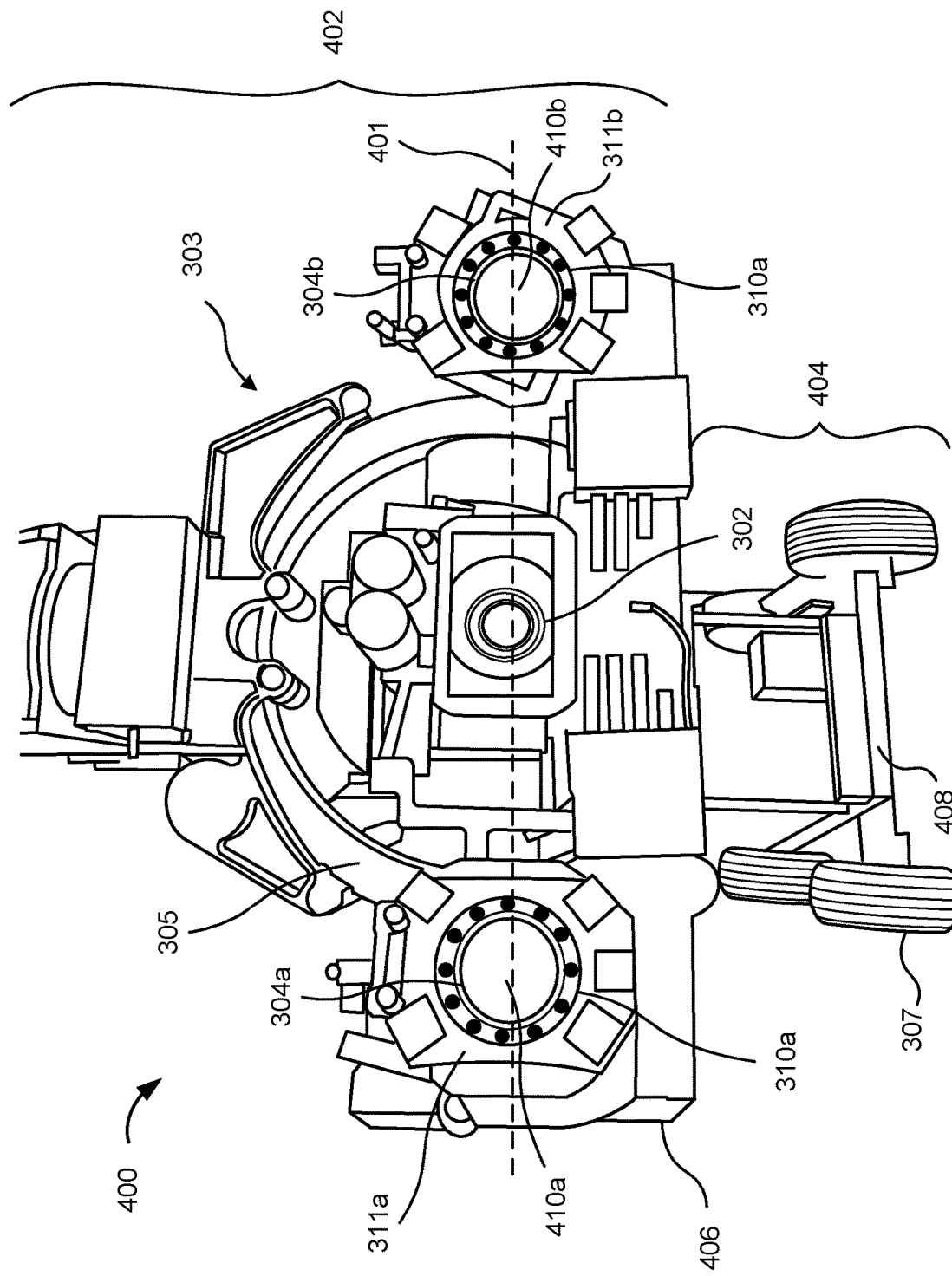
FIG. 4 is a detailed, front-facing, perspective view of a motion capture system configured as a movable rig, according to some embodiments of the present disclosure.

FIG. 4 is a detailed, front-facing, perspective view of a motion capture system 400 configured as a movable rig, such as motion capture system 300 in FIG. 3, according to some embodiments of the present disclosure. For ease of discussion, components of motion capture system 400 that correspond with components of motion capture system 300 are labeled with the reference number used in FIG. 3.

As shown in FIG. 4, taking camera 302 and witness cameras 304a-b are mounted on movable rig 303. In some embodiments, rig 303 can include a head portion 402 coupled to a body portion 404. Head portion 402 can extend forward and be closer to a filming subject (e.g., an actor in a set) than body portion 404 and include a head frame 406 (of which support structure 305 is a part) along with various electrical wires and other ancillary components for enabling the operation of cameras 302 and 304a-b. Body portion 404 can include a body frame 408 to which a plurality of wheels 307 can be mounted to enable movement of motion capture system 400. In some embodiments, head frame 406 is coupled to body frame 408 via nuts and bolts or by welding joints. In certain embodiments, head frame 406 and body frame 408 are part of a same monolithic structure. Head frame 406 and body frame 408 together can form a chassis on which cameras 302 and 304a-b are mounted.

According to some embodiments of the present disclosure, taking camera 302 and witness cameras 304a-b can be mounted on support structure 305 so that taking camera 302, witness cameras 304a-b, and support structure 305 together form a rigid composition of components that can tilt and turn together as a whole. In some embodiments, structure 305 is a support plate that has sufficient tensile strength to hold cameras 302 and 304a-b in a stable position above ground. Structure 305 can bend around taking camera 302 to provide clearance space for taking camera 302 while providing additional structural strength. In some embodiments, witness cameras 304a-b can be mounted on laterally opposite sides of taking camera 302 so that witness cameras 304a-b and taking camera 302 are substantially aligned to the same horizontal axis 401. It is to be appreciated, however, that embodiments are not limited to such configurations, as will be discussed further herein with respect to FIG. 6B.

As mentioned herein, witness cameras 304a-b can be configured to capture light only in the invisible (IR) wavelength spectrum. Thus, one or more optical filters 410a-b can be positioned in front of the respective lenses of witness cameras 304a-b. That way, only IR light can pass through to witness cameras 304a-b.

With reference back to FIG. 3, during image capture while actor 306 is performing, portions of light 312 and 314 emitted from light sources 308a-b and 310a-b can reflect back to cameras 302 and 304a-d, respectively, which can then simultaneously capture images of actor 306 and/or the actor's surroundings. As an example, a portion 316 of ambient light or visible light emitted from taking camera light source 308a can be reflected off of a face, or the entire body, of actor 306 and be captured by taking camera 302 in position A. In addition to portion 316, a portion 318 of visible light can be reflected off of objects in the set around actor 306, such as a chair 320 (or, from the use case scenario above, building facades, passing cars, or any other type of object found on a busy street in New York City), and also be captured by taking camera 302 in position A. According to some embodiments of the present disclosure, portions 223 and 324 of invisible light emitted from witness camera light sources 310a and 310b, respectively, can be reflected off a marker 326 on the face of actor 306 and be captured, simultaneously with the capturing of visible light by taking camera 302, by respective witness cameras 304a and 304b.

As can be seen from FIG. 3, witness cameras 304a and 304b can be positioned at laterally opposite sides of taking camera 302; thus, witness cameras 304a and 304b can view marker 326 from different angles and distances. This information can be utilized by a computer system, e.g., computer system 122 in FIG. 1, to triangulate the position of marker 326 in a three-dimensional environment. The triangulated position of marker 326 can be combined with the footage captured by taking camera 302 to generate accurate digital performances corresponding to actor 306. The same can be said for portions 330 and 332 of reflected IR light from marker 234, and portion 328 of reflected visible light from the face of actor 306, when taking camera 302 is at position B, as shown in FIG. 3, or any other position around actor 306. By being mounted on laterally opposite sides of taking camera 302, witness cameras 304a-b can be better positioned to track the movements of markers on the face of actor 306 because of the natural symmetry of a human's face across a vertical axis. For instance, witness camera 304a can better capture markers on the left side of actor's 306 face while witness camera 304b can better capture markers on the right side of actor's 306 face. And, when both cameras 304a-b are utilized together, the accuracy of determining the position of markers on actor 306 by triangulation can be increased.

It is to be noted that unlike motion capture system 200 in FIG. 2 where witness camera light sources 210a-c are positioned around actor 206 to illuminate actor 206 from all angles, witness camera light sources 310a-b only illuminate actor 306 from the angles at which witness cameras 304a-b are positioned. In this case, it may not be necessary to illuminate actor 306 with invisible light from any other light source at a different position because such invisible light will not be utilized, or will have negligible utilization, by witness cameras 304a-b. To further increase the amount of reflected invisible light 314 emitted by witness camera light sources 310a-b, markers on the face of actor 306, including markers 326 and 334, can be configured as retroreflective gel-based markers that reflect light back to its source with minimal scattering, as will be discussed further herein with respect to FIG. 7. Furthermore, to further differentiate the captured images by taking camera 302 and witness cameras 304a-b, the markers can be invisible to taking camera 302 but visible to witness cameras 304a-b. That way, taking camera 302 may not capture markers 326 and 334 on actor 306 during the performance so that the captured footage may not need to be edited to remove the presence of markers 326 and 334, which may often be the case where such markers are visible to taking camera 302. This can save time and cost associated with post processing of the captured images.

1. Camera Configurations

Figure 5A:
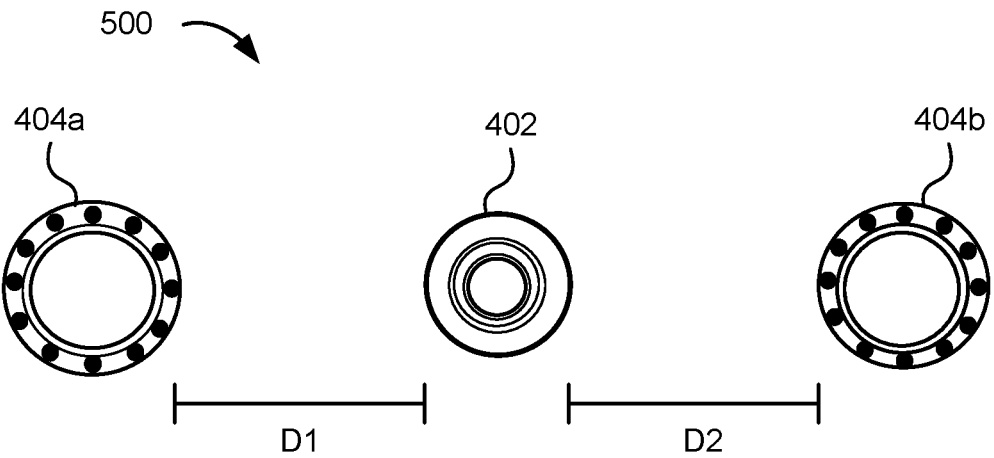
FIGS. 5A-5B are simplified illustrations of only the front ends of a taking camera and witness cameras in different camera arrangements, according to some embodiments of the present disclosure.

As mentioned herein with respect to FIGS. 3 and 4, witness cameras 304a-b can be mounted on laterally opposite sides of taking camera 302. In some embodiments, witness cameras 304a-b can be positioned at various distances away from taking camera 302 as discussed herein with respect to FIG. 5A. FIG. 5A is a simplified illustration 500 of only the front ends of taking camera 302 and witness cameras 304 to better illustrate their positioning with respect to one another, according to some embodiments of the present disclosure. Additionally, the reference numerals used in FIG. 3 are used in FIG. 5A for ease of understanding.

As shown in FIG. 5A, witness camera 304a is positioned a distance D1 away from a left side of taking camera 302 and witness camera 304b is positioned a distance D2 away from a right side of taking camera 302. In some embodiments, D1 and D2 are the same distances such that witness camera 304a is positioned the same distance away from taking camera 302 as witness camera 304b. In other embodiments, D1 and D2 can be different. D1 and D2 can be increased and decreased depending on distance to the actor and desired accuracy for triangulation. For instance, when the actor is positioned farther away, D1 and D2 may need to be increased to get more distinct captured images. If the distances D1 and D2 were small and the actor was positioned far away, witness cameras 304a-b may essentially be capturing the same images given their close proximity to one another relative to their distance away from the actor, thereby decreasing the accuracy of triangulation. In some embodiments, distances D1 and D2 are each between six inches and two feet.

Figure 5B:
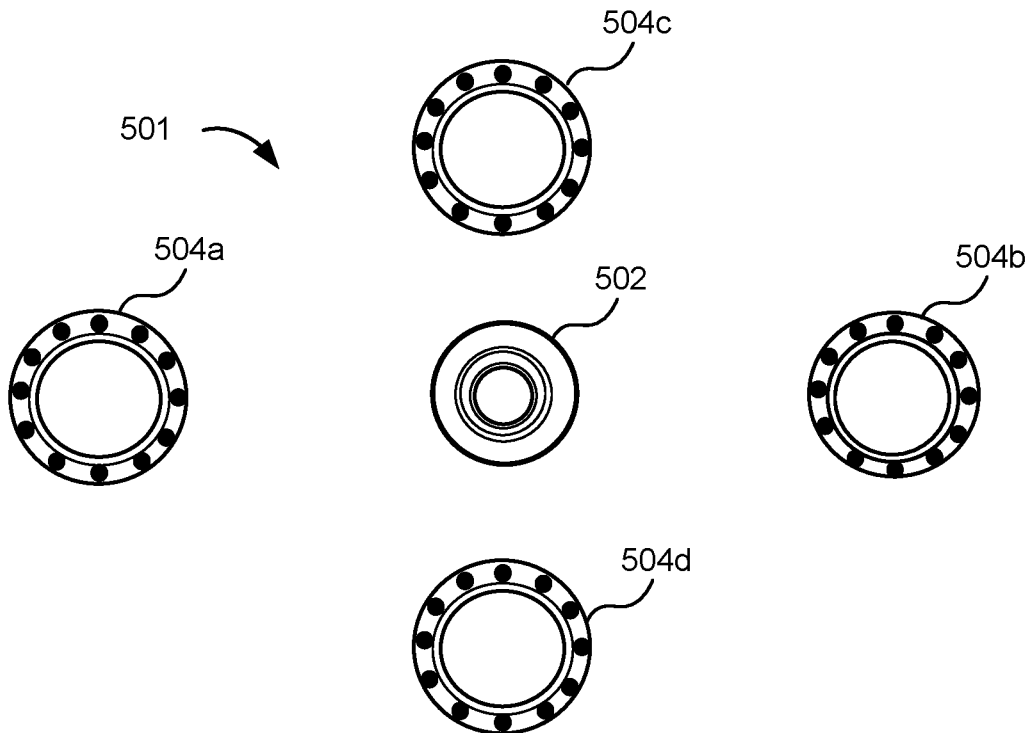

Although embodiments herein have discussed motion capture systems with movable rigs as having two witness cameras positioned on laterally opposite sides of a taking camera, embodiments are not limited to such configurations, and that any configuration with more or less than two cameras positioned in any location around the taking camera are envisioned herein. FIG. 5B is a simplified illustration of an exemplary camera arrangement 501, according to some embodiments of the present disclosure. Camera arrangement 501 can include taking camera 502 surrounded by witness cameras 504a-d. Witness cameras 504a-b can be positioned on laterally opposite sides of taking camera 502, while witness cameras 504c-d can be positioned on vertically opposite ends of taking camera 502, as shown in FIG. 5B. By having witness cameras 502c-d in addition to witness cameras 504a-b, an additional pair of witness cameras can provide positioning information to increase the accuracy of position determination of markers on an actor. Although FIG. 5B illustrates camera arrangement 501 as having witness cameras 504a-d positioned laterally and vertically with respect to taking camera 502, embodiments are not limited to such configurations and that configurations with any number of witness cameras positioned in any location around taking camera 502 are envisioned herein.

2. Angle of Orientation of Witness Cameras

Figure 6A:
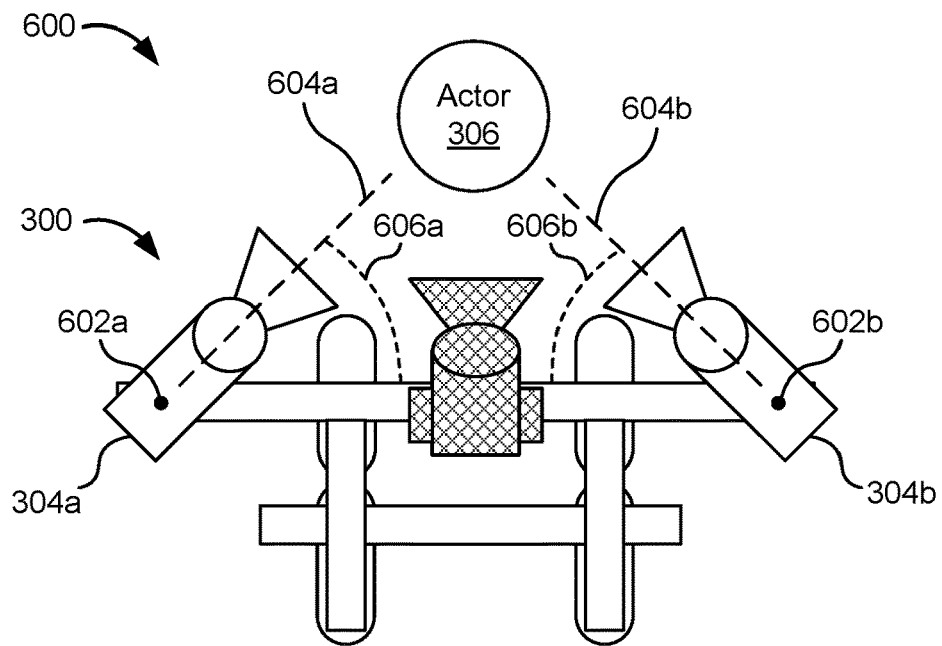
FIG. 6A is a simplified diagram of an exemplary configuration of a motion capture system where an actor is positioned close to the system, according to some embodiments of the present disclosure.
Figure 6B:
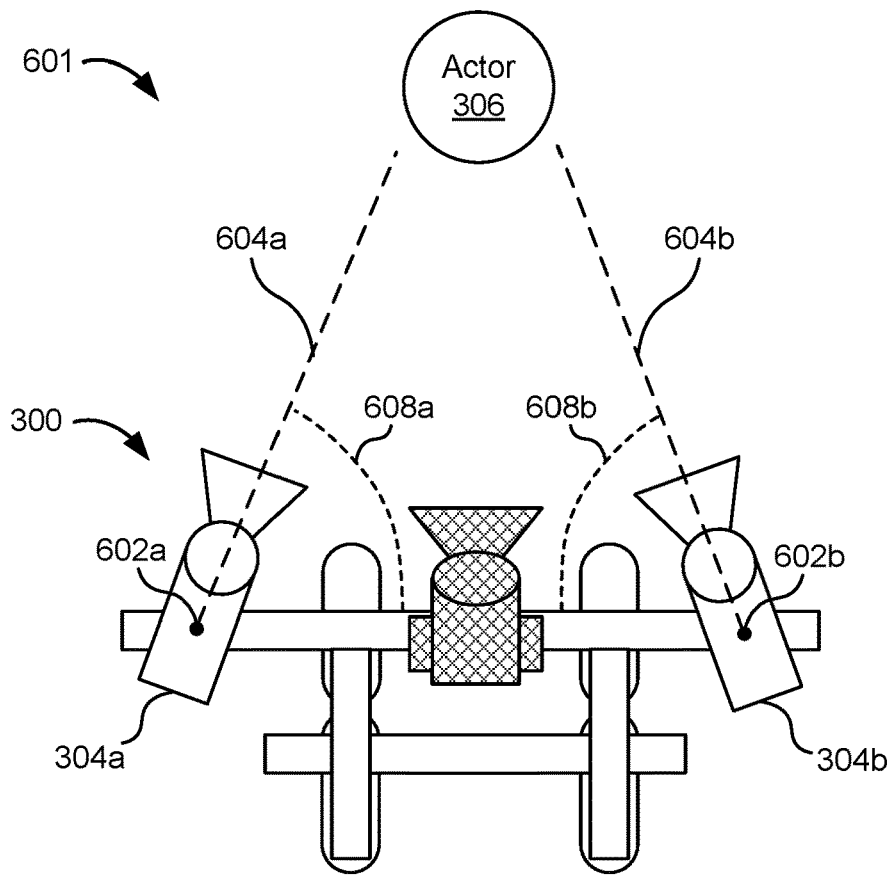
FIG. 6B is a simplified diagram of an exemplary configuration of a motion capture system where an actor is positioned far away from the system, according to some embodiments of the present disclosure.

In addition to being able to modify the distance between the taking camera and each witness camera, motion capture systems with movable rigs can also modify the rotational orientation of each witness camera. For instance, witness cameras can be oriented in different angles for filming subjects positioned at different distances away from the motion capturing system. FIGS. 6A and 6B illustrate exemplary configurations for a motion capturing system where a filming subject is positioned at different distances away from the motion capturing system, according to some embodiments of the present disclosure. Specifically, FIG. 6A is a simplified diagram of an exemplary configuration 600 of motion capture system 300 of FIG. 3 where actor 306 is positioned close to system 300, and FIG. 6B is a simplified diagram of an exemplary configuration 601 of motion capture system 300 where actor 306 is positioned far away from system 300.

In some embodiments, witness cameras 304a-b can be rotated around respective pivot points 602a-b so that witness cameras 304a-b can be positioned at different angles with respect to support structure 305. For instance, as shown in FIG. 6A, when actor 306 is positioned close to system 300, witness cameras 304a-b can each be pivoted around respective pivot points 602a-b and be oriented along respective central axes 604a-b so that cameras 304a-b are pointed at actor 306. In such instances, central axes 604a-b can be oriented at respective angles 606a-b. On the other hand, when actor 306 is positioned far away from system 300, as shown in FIG. 6B, witness cameras 304a-b can be pivoted around their respective pivot points 602a-b so that their central axis 604a-b are oriented at respective angles 606A-b, which are greater than angles 606a-b. Angles 606a-b and 606A-b may not exceed 90 degrees to ensure that witness cameras 304a-b can focus on actor 306. By enabling witness cameras 304a-b to rotate around a pivot point, motion capture system 300 can be better suited to capture motion when actor 306 is positioned at various distances away from the motion capture system as the actor may perform at different locations in a set.

In some embodiments, witness cameras 304a-b can be fixed in each angular position for the duration of a performance by actor 306, or witness cameras 304a-b can dynamically adjust its angular position during the performance so that central axes 604a-b of witness cameras 304a-b are continuously aligned with actor 306 as actor 306 moves around a set during the performance. In the latter case, one or more sensors and motors can be implemented to track the position of actor 306 and mechanically rotate cameras 304a-b in real time to align their central axes 604a-b with actor 306.

II. Gel-Based Markers

As briefly mentioned above with respect to FIGS. 2 and 3, a plurality of markers can be positioned on an actor's face to capture the motion of an actor's head by reflecting invisible light but not visible light. According to some embodiments of the present disclosure, the markers can be retroreflective gel-based markers that can be applied to an actor's face as if it were makeup. As a retroreflective substance, each marker, when applied to an actor's face, can act as a surface that reflects light back to its source with a minimum of scattering along a vector that is parallel but opposite in direction from the light's source. By being retroreflective, each marker can effectively negate any noise from ambient light. For instance, under normal lighting conditions indoors (i.e., absent lights directly beaming at the markers), the markers may not be visible or have negligible visibility. For instances where a set is positioned outside, the sun can emit vast amounts of IR light. However, because the markers are retroreflective, the IR light emitted from the sun may not reflect back to the witness cameras. Instead, only the IR light emitted from the witness camera light sources (e.g., ring of IR LEDs around the witness cameras' lenses) will get reflected back to the witness cameras.

To enable the retroreflectivity of the gel-based markers, the gel-based markers can be formed of a plurality of microspheres suspended within a gel. The plurality of microspheres can be formed of glass or some other mirror-like material that enables the retroreflective properties of the gel-based markers. In some embodiments, the plurality of microspheres are formed of a first set of microspheres having a first diameter, and a second set of microspheres having a second diameter different from the first. The first set of microspheres can have a larger diameter than the second set of microspheres so that the spaces between the first set of microspheres can be filled in by the second set of microspheres to achieve a fuller coverage of a surface upon which the gel-based marker is applied. In some embodiments, the gel in which the microspheres are suspended can be substantially transparent to IR light so that IR light can enter and exit the gel without being substantially attenuated. In some embodiments, the gel is not transparent to visible light, but transparent to IR light. In such cases, the gel can exhibit a pigment that matches the skin color of the actor so that the markers can be inconspicuous when worn by the actor. The gel may be any suitable type of gel, such as standard hand sanitizer or a glycerin-based gel.

Figure 7:
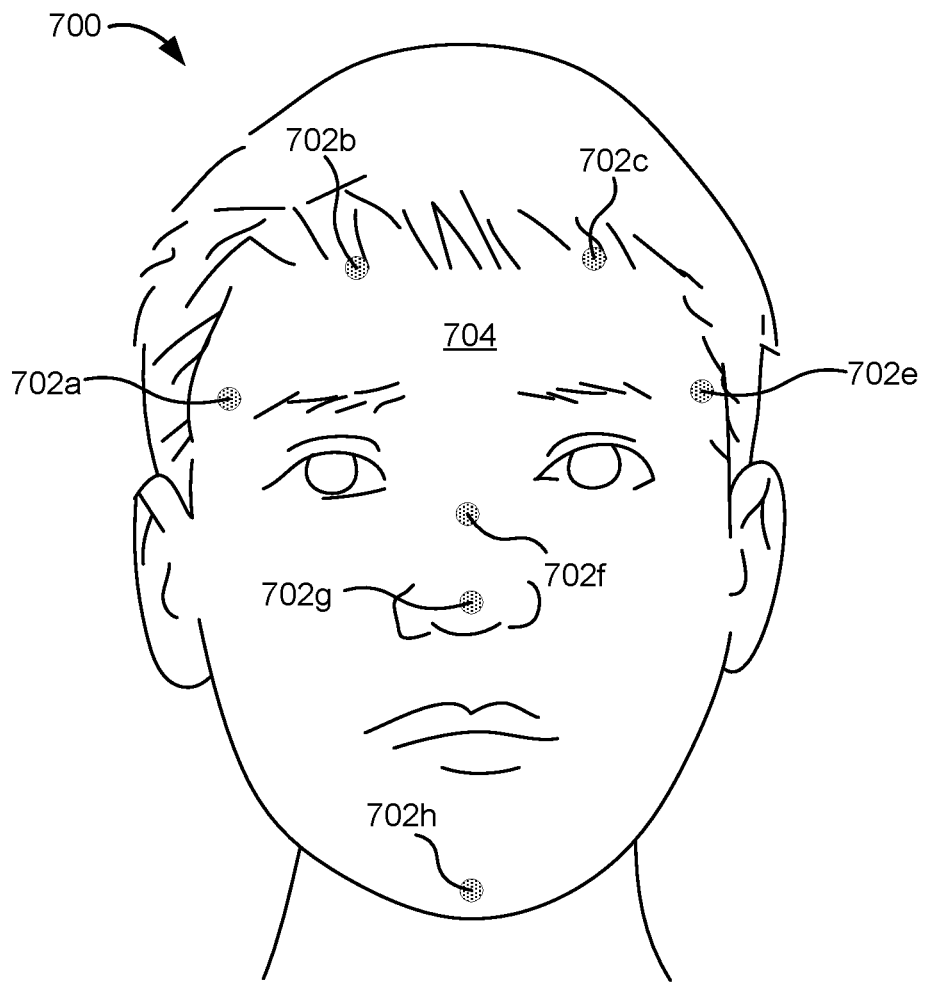
FIG. 7 is a simplified illustration of exemplary positions for gel-based markers that enable motion capture of the skull of an actor during a performance, according to some embodiments of the present disclosure.

In some embodiments, the gel-based markers can be positioned at various locations on an actor's face to enable motion capture of the actor's skull as he or she is performing. For example, the gel-based markers may be applied to two, three, six, eight, or more points on an actor's face. The markers can be positioned on substantially rigid parts of an actor's face to minimize distortion caused by facial movement during a performance. FIG. 7 is a simplified illustration 700 of exemplary positions for gel-based markers 702a-g that enable motion capture of the skull of an actor 704 during a performance, according to some embodiments of the present disclosure. As shown in FIG. 7, markers 702a and 702e can be positioned at the temples of actor 704, markers 702b and 702c can be positioned along the hairline of actor 704, markers 702f and 702g can be positioned on the nose bridge and tip, respectively, and marker 702h can be positioned on the chin of actor 704. These positions are selected because they may be substantially free of movement caused by facial expressions and talking. That way, the positions can closely track the movement of the skull of actor 704. By tracking these positions, the witness cameras can more accurately capture the movement of the actor's head.

Each marker 702a-h can be any shape suitable for motion capture by witness cameras. For instance, each marker can be substantially circular, oval, triangular, square, rectangular, and the like. It is to be appreciated that any shape that does not depart from the spirit and scope of the present disclosure can be utilized in embodiments herein.

According to some embodiments of the present disclosure, and as mentioned several times herein, markers 702a-h can be unreflective and unabsorptive to visible light, but highly retroreflective to IR light. Thus, even though a taking camera and one or more witness cameras are filming an actor with markers 702a-h, only the witness cameras may capture markers 702a-h. By applying markers that are only visible to witness cameras and not a taking camera, embodiments enable the generation of content using a minimal number of performances by a performer. More specifically, a performer only needs to perform a single performance in order (1) to generate images directly usable for an item of content and/or driving a digital character in a virtual environment and (2) for accurately determining the location of a digital character mapped to the actor's head in a virtual environment.

III. Method for Motion Capture

Figure 8:
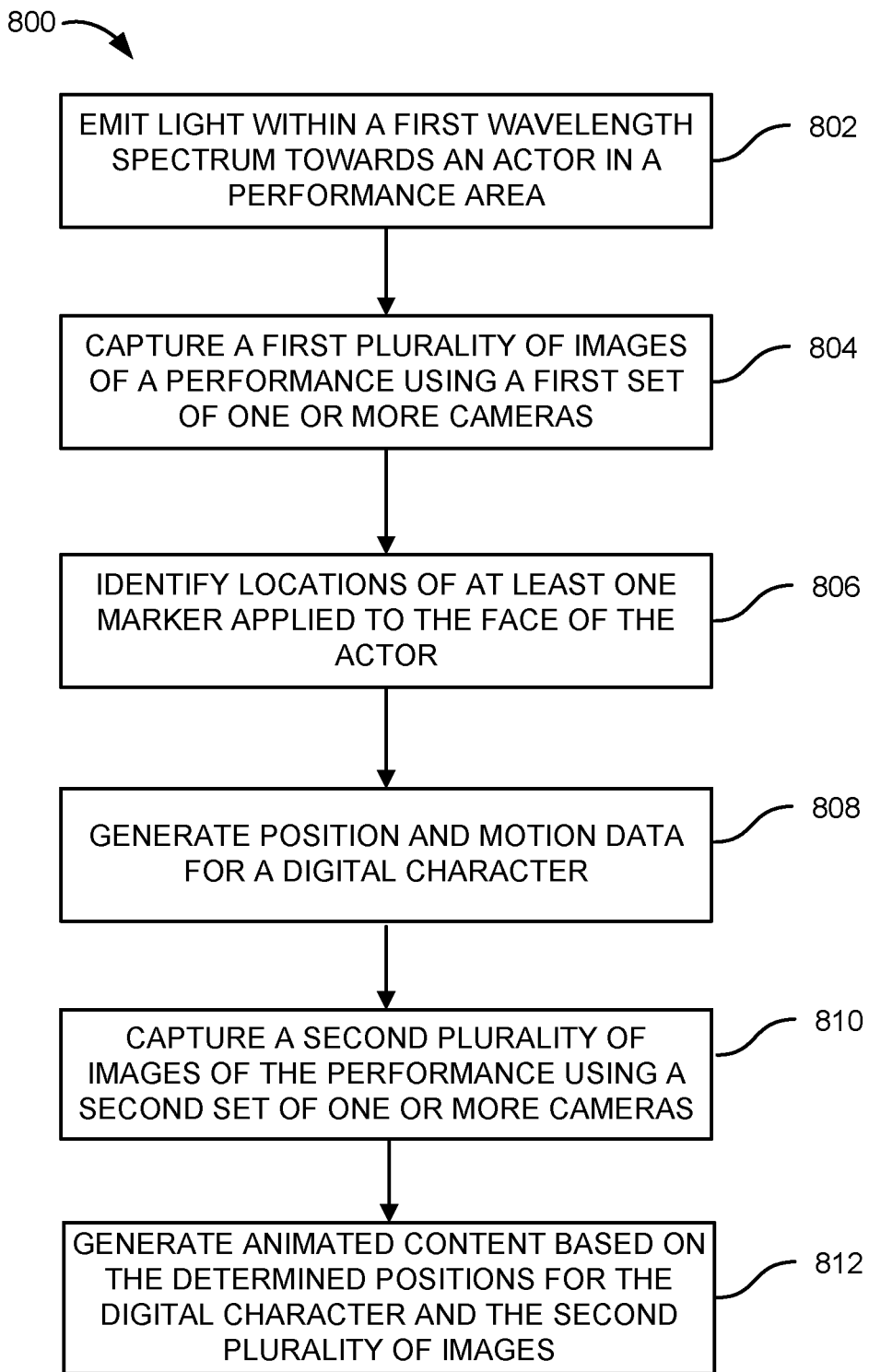
FIG. 8 is a flow diagram of a method for performing motion capture with a motion capture system, according to some embodiments of the present disclosure.

FIG. 8 is a flow diagram of a method 800 for performing motion capture with a motion capture system, according to some embodiments of the present disclosure. At block 802, light within a first wavelength spectrum can be emitted towards a performance area. For example, standalone witness camera light sources (e.g., sources 310a-c), or witness light sources (e.g., sources 310a-b) formed as part of respective witness cameras mounted on a movable rig can emit invisible light towards an actor (e.g., actor 306 or 306) in a set, as discussed herein with respect to FIGS. 2 and 3. The invisible light can be within the IR light wavelength spectrum, such as within a wavelength spectrum of between 701 nm and 1 mm.

At block 804, a first plurality of images of a performance can be captured by a first set of one or more cameras. As an example, images of a plurality of markers applied to substantially rigid portions an actor's face (e.g., forehead, nose, cheek bones, temple, chin, etc.) while the actor is performing can be captured by witness cameras, e.g., witness cameras 304a-d or witness cameras 304a-b in FIGS. 2 and 3 can capture markers applied to the faces of actors 306 and 306, respectively.

At block 806, locations of at least one marker applied to the actor's face can be identified. For instance, positions captured by witness cameras 304a-b can be triangulated to determine the locations of the markers in the performance area. This location can then be used to position a digital character, or one or more features thereof such as the face of a digital character, whose position accurately corresponds to the location of the markers applied to the actor's face so that the digital character can accurately represent the actor's face.

At block 808, position and motion data for a digital character in a virtual environment can be determined based on the identified locations of the markers applied to the actor's face. For instance, a computer system, e.g., computer system 122 in FIG. 1, can receive the captured images of one or more witness cameras and utilize the captured images to determine the position of the markers on the actor via triangulation. Once the position of the markers are determined, then a digital character can be rendered and positioned at a location within the virtual environment that corresponds to the determined positions of the markers. In some embodiments, the position of the markers with respect to one another can be used to determine the orientation at which the digital character faces in the virtual environment. For instance, the position of the marker at the tip of the nose relative to the positions of the markers at the temple, hairline, and chin can be used to determine which way the actor's face is oriented. This information can then be used to determine the orientation of the digital character in the virtual environment.

At block 810, a second plurality of images of the performance can be captured by a second set of one or more cameras. For instance, a taking camera, e.g., taking camera 302 or 302 in FIGS. 2 and 3, respectively, can capture images of an actor and his or her surroundings in a set during the actor's performance. In some embodiments, the second set of one or more cameras captures the images simultaneously with the first set of one or more cameras. That way, the captured images can be of the same performance but just from different perspectives. However, the second plurality of images may be based upon what is perceived from reflected visible light. For example, the way the actor's face and costume looks, the way the chair looks, and how the actor is positioned with respect to the chair can all be captured by the second set of one or more cameras.

Thereafter, at block 812, content can be generated based on the determined positions for the digital character and the second plurality of images. That is, content can be generated where the digital character is positioned within the set as perceived by the taking camera. In some instances, the digital character can be positioned where the actor is positioned when viewed from the taking camera. Thus, the digital character can be have a size and positioning that accurately corresponds to the size and movements of the actor as captured by the witness cameras when the witness cameras are capturing the images of the markers on the actor's face.

For example, 3D positioning of the markers can be determined via triangulation techniques to determine the position of one or more markers on the surfaces of the actor's face. This process may be performed at different times, to thereby determine where and how a marker on the face of an actor moves as he or she performs. The 3D positioning data may then be used to set a pose of the rigid portions of a computer generated object, e.g. face. The computer generated object can be positioned within a setting captured in the second plurality of images by the second set of cameras. The second plurality of images may be used by a suitable solver system to determine the movement of those features of the computer generated object that are substantially non-rigid (e.g., an actor's eyebrows, eyes, cheeks, etc). Since images of the markers and images of the actor during the performance were captured, the computer generated object can accurately be mapped to the actor's face in the resulting content.

IV. Example Computer System

Figure 9:
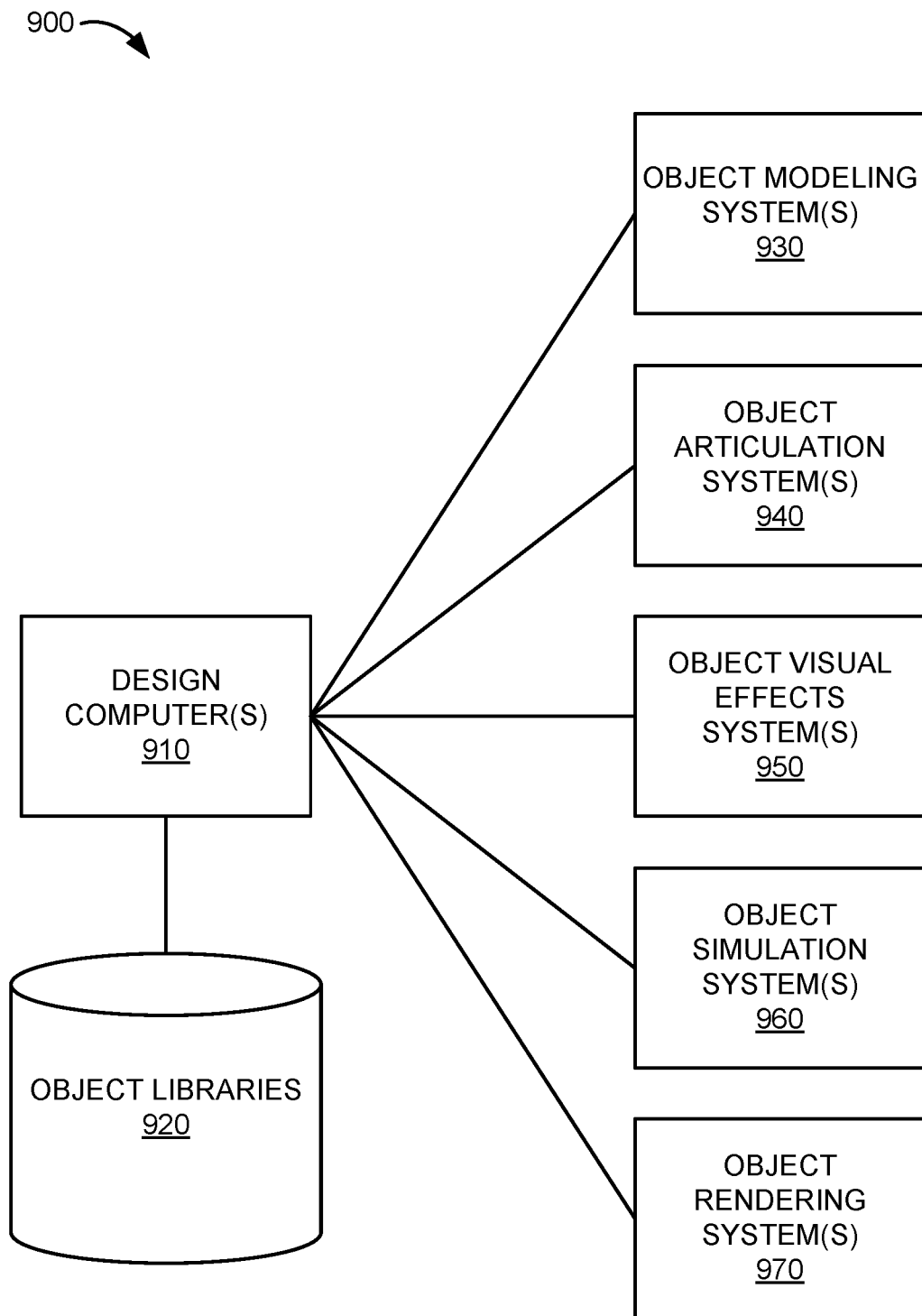
FIG. 9 is a simplified block diagram of system for creating computer graphics imagery (CGI) and computer-aided animation that may implement or incorporate various embodiments in accordance with the disclosure.

FIG. 9 is a simplified block diagram of system 900 for creating computer graphics imagery (CGI) and computer-aided visual effects that may implement or incorporate various embodiments in accordance with the disclosure. In this example, system 900 can include one or more design computers 910, object library 920, one or more object modeler systems 930, one or more object articulation systems 940, one or more object visual effects systems 950, one or more object simulation systems 960, and one or more object rendering systems 970. Any of the systems 930-970 may be invoked by or used directly by a user of the one or more design computers 910 and/or automatically invoked by or used by one or more processes associated with the one or more design computers 910. Any of the elements of system 900 can include hardware and/or software elements configured for specific functions.

The one or more design computers 910 can include hardware and software elements configured for designing CGI and assisting with computer-aided animation. Each of the one or more design computers 910 may be embodied as a single computing device or a set of one or more computing devices. Some examples of computing devices are PCs, laptops, workstations, mainframes, cluster computing system, grid computing systems, cloud computing systems, embedded devices, computer graphics devices, gaming devices and consoles, consumer electronic devices having programmable processors, or the like. The one or more design computers 910 may be used at various stages of a production process (e.g., pre-production, designing, creating, editing, simulating, animating, rendering, post-production, etc.) to produce images, image sequences, motion pictures, video, audio, or associated effects related to CGI and animation.

In one example, a user of the one or more design computers 910 acting as a modeler may employ one or more systems or tools to design, create, or modify objects within a computer-generated scene. The modeler may use modeling software to sculpt and refine a 3D model to fit predefined aesthetic needs of one or more character designers. The modeler may design and maintain a modeling topology conducive to a storyboarded range of deformations. In another example, a user of the one or more design computers 910 acting as an articulator may employ one or more systems or tools to design, create, or modify controls or animation variables (avars) of models. In general, rigging is a process of giving an object, such as a character model, controls for movement, therein "articulating" its ranges of motion. The articulator may work closely with one or more animators in rig building to provide and refine an articulation of the full range of expressions and body movement needed to support a character's acting range in an animation.

In a further example, a user of design computer 910 acting as an animator may employ one or more systems or tools to specify motion and position of one or more objects over time to produce an animation.

Object library 920 can include elements configured for storing and accessing information related to objects used by the one or more design computers 910 during the various stages of a production process to produce CGI and animation. Some examples of object library 920 can include a file, a database, or other storage devices and mechanisms. Object library 920 may be locally accessible to the one or more design computers 910 or hosted by one or more external computer systems.

Some examples of information stored in object library 920 can include an object itself, metadata, object geometry, object topology, rigging, control data, animation data, animation cues, simulation data, texture data, lighting data, shader code, or the like. An object stored in object library 920 can include any entity that has an n-dimensional (e.g., 2D or 3D) surface geometry. The shape of the object can include a set of points or locations in space (e.g., object space) that make up the object's surface. Topology of an object can include the connectivity of the surface of the object (e.g., the genus or number of holes in an object) or the vertex/edge/face connectivity of an object.

The one or more object modeling systems 930 can include hardware and/or software elements configured for modeling one or more objects. Modeling can include the creating, sculpting, and editing of an object. In various embodiments, the one or more object modeling systems 930 may be configured to generated a model to include a description of the shape of an object. The one or more object modeling systems 930 can be configured to facilitate the creation and/or editing of features, such as non-uniform rational B-splines or NURBS, polygons and subdivision surfaces (or SubDivs), that may be used to describe the shape of an object. In general, polygons are a widely used model medium due to their relative stability and functionality. Polygons can also act as the bridge between NURBS and SubDivs. NURBS are used mainly for their ready-smooth appearance and generally respond well to deformations. SubDivs are a combination of both NURBS and polygons representing a smooth surface via the specification of a coarser piecewise linear polygon mesh. A single object may have several different models that describe its shape.

The one or more object modeling systems 930 may further generate model data (e.g., 2D and 3D model data) for use by other elements of system 900 or that can be stored in object library 920. The one or more object modeling systems 930 may be configured to allow a user to associate additional information, metadata, color, lighting, rigging, controls, or the like, with all or a portion of the generated model data.

The one or more object articulation systems 940 can include hardware and/or software elements configured to articulating one or more computer-generated objects. Articulation can include the building or creation of rigs, the rigging of an object, and the editing of rigging. In various embodiments, the one or more articulation systems 940 can be configured to enable the specification of rigging for an object, such as for internal skeletal structures or eternal features, and to define how input motion deforms the object. One technique is called "skeletal animation," in which a character can be represented in at least two parts: a surface representation used to draw the character (called the skin) and a hierarchical set of bones used for animation (called the skeleton).

The one or more object articulation systems 940 may further generate articulation data (e.g., data associated with controls or animations variables) for use by other elements of system 900 or that can be stored in object library 920. The one or more object articulation systems 940 may be configured to allow a user to associate additional information, metadata, color, lighting, rigging, controls, or the like, with all or a portion of the generated articulation data.

The one or more object visual effects systems 950 can include hardware and/or software elements configured for animating one or more computer-generated objects. Animation can include the specification of motion and position of an object over time. The one or more object visual effects systems 950 may be invoked by or used directly by a user of the one or more design computers 910 and/or automatically invoked by or used by one or more processes associated with the one or more design computers 910.

In various embodiments, the one or more visual effects systems 950 may be configured to enable users to manipulate controls or animation variables or utilized character rigging to specify one or more key frames of animation sequence. The one or more visual effects systems 950 generate intermediary frames based on the one or more key frames. In some embodiments, the one or more visual effects systems 950 may be configured to enable users to specify animation cues, paths, or the like according to one or more predefined sequences. The one or more visual effects systems 950 generate frames of the animation based on the animation cues or paths. In further embodiments, the one or more visual effects systems 950 may be configured to enable users to define animations using one or more animation languages, morphs, deformations, or the like. In various embodiments, the one or more visual effects systems 950 may be configured to generate animated content utilizing captured images from taking and witness cameras of any of the motion capture systems discussed herein.

The one or more object visual effects systems 950 may further generate animation data (e.g., inputs associated with controls or animations variables) for use by other elements of system 900 or that can be stored in object library 920. The one or more object visual effects systems 950 may be configured to allow a user to associate additional information, metadata, color, lighting, rigging, controls, or the like, with all or a portion of the generated animation data.

The one or more object simulation systems 960 can include hardware and/or software elements configured for simulating one or more computer-generated objects. Simulation can include determining motion and position of an object over time in response to one or more simulated forces or conditions. The one or more object simulation systems 960 may be invoked by or used directly by a user of the one or more design computers 910 and/or automatically invoked by or used by one or more processes associated with the one or more design computers 910.

In various embodiments, the one or more object simulation systems 960 may be configured to enables users to create, define, or edit simulation engines, such as a physics engine or physics processing unit (PPU/GPGPU) using one or more physically-based numerical techniques. In general, a physics engine can include a computer program that simulates one or more physics models (e.g., a Newtonian physics model), using variables such as mass, velocity, friction, wind resistance, or the like. The physics engine may simulate and predict effects under different conditions that would approximate what happens to an object according to the physics model. The one or more object simulation systems 960 may be used to simulate the behavior of objects, such as hair, fur, and cloth, in response to a physics model and/or animation of one or more characters and objects within a computer-generated scene.

The one or more object simulation systems 960 may further generate simulation data (e.g., motion and position of an object over time) for use by other elements of system 90 or that can be stored in object library 920. The generated simulation data may be combined with or used in addition to animation data generated by the one or more object visual effects systems 950. The one or more object simulation systems 960 may be configured to allow a user to associate additional information, metadata, color, lighting, rigging, controls, or the like, with all or a portion of the generated simulation data.

The one or more object rendering systems 970 can include hardware and/or software element configured for "rendering" or generating one or more images of one or more computer-generated objects. "Rendering" can include generating an image from a model based on information such as geometry, viewpoint, texture, lighting, and shading information. The one or more object rendering systems 970 may be invoked by or used directly by a user of the one or more design computers 910 and/or automatically invoked by or used by one or more processes associated with the one or more design computers 910. One example of a software program embodied as the one or more object rendering systems 970 can include PhotoRealistic RenderMan, or PRMan, produced by Pixar Animations Studios of Emeryville, Calif.

In various embodiments, the one or more object rendering systems 970 can be configured to render one or more objects to produce one or more computer-generated images or a set of images over time that provide an animation. The one or more object rendering systems 970 may generate digital images or raster graphics images.

In various embodiments, a rendered image can be understood in terms of a number of visible features. Some examples of visible features that may be considered by the one or more object rendering systems 970 may include shading (e.g., techniques relating to how the color and brightness of a surface varies with lighting), texture-mapping (e.g., techniques relating to applying detail information to surfaces or objects using maps), bump-mapping (e.g., techniques relating to simulating small-scale bumpiness on surfaces), fogging/participating medium (e.g., techniques relating to how light dims when passing through non-clear atmosphere or air) shadows (e.g., techniques relating to effects of obstructing light), soft shadows (e.g., techniques relating to varying darkness caused by partially obscured light sources), reflection (e.g., techniques relating to mirror-like or highly glossy reflection), transparency or opacity (e.g., techniques relating to sharp transmissions of light through solid objects), translucency (e.g., techniques relating to highly scattered transmissions of light through solid objects), refraction (e.g., techniques relating to bending of light associated with transparency), diffraction (e.g., techniques relating to bending, spreading and interference of light passing by an object or aperture that disrupts the ray), indirect illumination (e.g., techniques relating to surfaces illuminated by light reflected off other surfaces, rather than directly from a light source, also known as global illumination), caustics (e.g., a form of indirect illumination with techniques relating to reflections of light off a shiny object, or focusing of light through a transparent object, to produce bright highlight rays on another object), depth of field (e.g., techniques relating to how objects appear blurry or out of focus when too far in front of or behind the object in focus), motion blur (e.g., techniques relating to how objects appear blurry due to high-speed motion, or the motion of the camera), non-photorealistic rendering (e.g., techniques relating to rendering of scenes in an artistic style, intended to look like a painting or drawing), or the like.

The one or more object rendering systems 970 may further render images (e.g., motion and position of an object over time) for use by other elements of system 900 or that can be stored in object library 920. The one or more object rendering systems 970 may be configured to allow a user to associate additional information or metadata with all or a portion of the rendered image.

Figure 10:
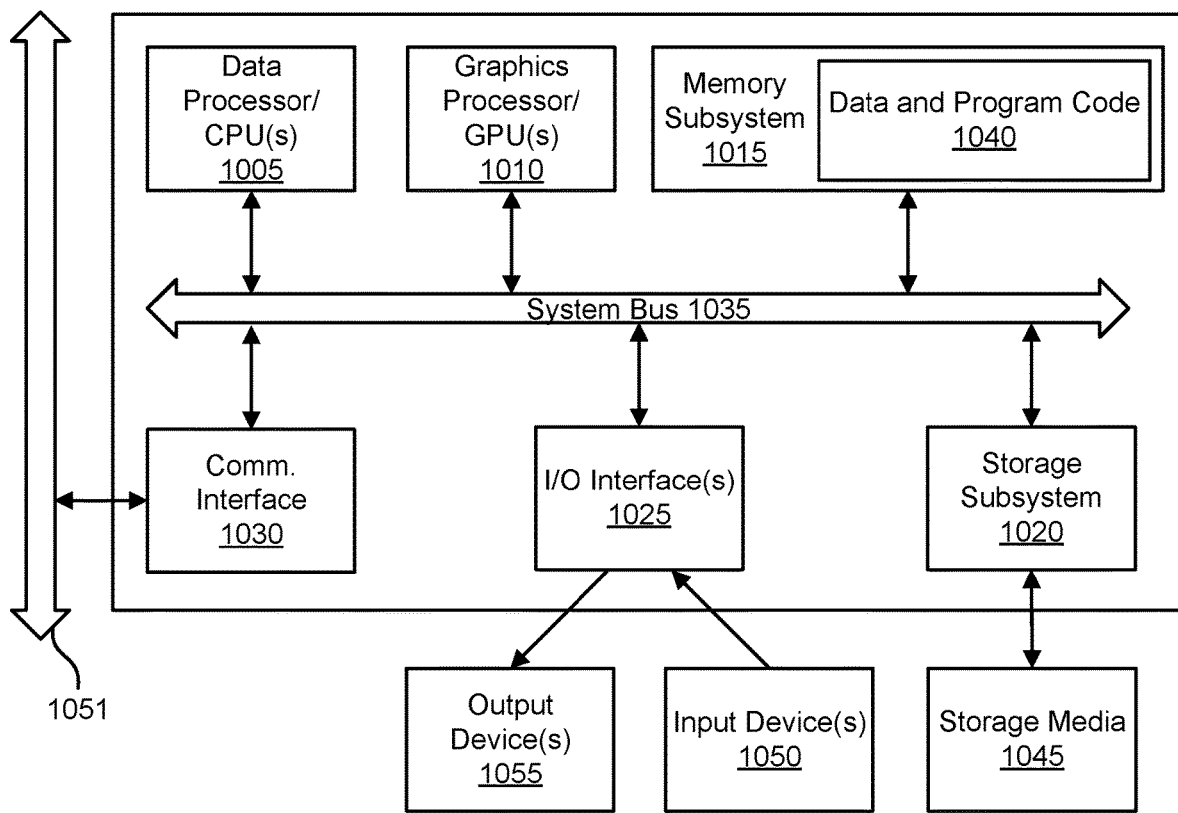
FIG. 10 is a block diagram of an exemplary computer system, according to some embodiments of the present disclosure.

FIG. 10 is a block diagram of computer system 1000. FIG. 10 is merely illustrative. In some embodiments, a computer system includes a single computer apparatus, where the subsystems can be the components of the computer apparatus. In other embodiments, a computer system can include multiple computer apparatuses, each being a subsystem, with internal components. Computer system 1000 and any of its components or subsystems can include hardware and/or software elements configured for performing methods described herein.

Computer system 1000 may include familiar computer components, such as one or more one or more data processors or central processing units (CPUs) 1005, one or more graphics processors or graphical processing units (GPUs) 1010, memory subsystem 1015, storage subsystem 1020, one or more input/output (I/O) interfaces 1025, communications interface 1030, or the like. Computer system 1000 can include system bus 1035 interconnecting the above components and providing functionality, such connectivity and inter-device communication.

The one or more data processors or central processing units (CPUs) 1005 can execute logic or program code or for providing application-specific functionality. Some examples of CPU(s) 1005 can include one or more microprocessors (e.g., single core and multi-core) or micro-controllers, one or more field-gate programmable arrays (FPGAs), and application-specific integrated circuits (ASICs). As used herein, a processor includes a multi-core processor on a same integrated chip, or multiple processing units on a single circuit board or networked.

The one or more graphics processor or graphical processing units (GPUs) 1010 can execute logic or program code associated with graphics or for providing graphics-specific functionality. GPUs 1010 may include any conventional graphics processing unit, such as those provided by conventional video cards. In various embodiments, GPUs 1010 may include one or more vector or parallel processing units. These GPUs may be user programmable, and include hardware elements for encoding/decoding specific types of data (e.g., video data) or for accelerating 2D or 3D drawing operations, texturing operations, shading operations, or the like. The one or more graphics processors or graphical processing units (GPUs) 1010 may include any number of registers, logic units, arithmetic units, caches, memory interfaces, or the like.

Memory subsystem 1015 can store information, e.g., using machine-readable articles, information storage devices, or computer-readable storage media. Some examples can include random access memories (RAM), read-only-memories (ROMS), volatile memories, non-volatile memories, and other semiconductor memories. Memory subsystem 1015 can include data and program code 1040.

Storage subsystem 1020 can also store information using machine-readable articles, information storage devices, or computer-readable storage media. Storage subsystem 1020 may store information using storage media 1045. Some examples of storage media 1045 used by storage subsystem 1020 can include floppy disks, hard disks, optical storage media such as CD-ROMs, DVDs and bar codes, removable storage devices, networked storage devices, or the like. In some embodiments, all or part of data and program code 1040 may be stored using storage subsystem 1020.

The one or more input/output (I/O) interfaces 1025 can perform I/O operations. One or more input devices 1050 and/or one or more output devices 1055 may be communicatively coupled to the one or more I/O interfaces 1025. The one or more input devices 1050 can receive information from one or more sources for computer system 1000. Some examples of the one or more input devices 1050 may include a computer mouse, a trackball, a track pad, a joystick, a wireless remote, a drawing tablet, a voice command system, an eye tracking system, external storage systems, a monitor appropriately configured as a touch screen, a communications interface appropriately configured as a transceiver, or the like. In various embodiments, the one or more input devices 1050 may allow a user of computer system 1000 to interact with one or more non-graphical or graphical user interfaces to enter a comment, select objects, icons, text, user interface widgets, or other user interface elements that appear on a monitor/display device via a command, a click of a button, or the like.

The one or more output devices 1055 can output information to one or more destinations for computer system 1000. Some examples of the one or more output devices 1055 can include a printer, a fax, a feedback device for a mouse or joystick, external storage systems, a monitor or other display device, a communications interface appropriately configured as a transceiver, or the like. The one or more output devices 1055 may allow a user of computer system 1000 to view objects, icons, text, user interface widgets, or other user interface elements. A display device or monitor may be used with computer system 1000 and can include hardware and/or software elements configured for displaying information.

Communications interface 1030 can perform communications operations, including sending and receiving data. Some examples of communications interface 1030 may include a network communications interface (e.g. Ethernet, Wi-Fi, etc.). For example, communications interface 1030 may be coupled to communications network/external bus 1051, such as a computer network, a USB hub, or the like. A computer system can include a plurality of the same components or subsystems, e.g., connected together by communications interface 1030 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

Computer system 1000 may also include one or more applications (e.g., software components or functions) to be executed by a processor to execute, perform, or otherwise implement techniques disclosed herein. These applications may be embodied as data and program code 1040. Additionally, computer programs, executable computer code, human-readable source code, shader code, rendering engines, or the like, and data, such as image files, models including geometrical descriptions of objects, ordered geometric descriptions of objects, procedural descriptions of models, scene descriptor files, or the like, may be stored in memory subsystem 1015 and/or storage subsystem 1020.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of explanation, numerous specific details have been set forth in order to provide a thorough understanding of various embodiments of the present invention. It will be apparent, however, to one skilled in the art that embodiments of the present invention may be practiced without some of these specific details. In other instances, well-known structures and devices may have been shown in block diagram form.

This description has provided exemplary embodiments only, and is not intended to limit the scope, applicability, or configuration of the disclosure. Rather, this description of the exemplary embodiments provides those skilled in the art with an enabling description for implementing an exemplary embodiment. It should be understood that various changes may be made in the function and arrangement of elements without departing from the spirit and scope of the invention as set forth in the appended claims.

Specific details have been given in the description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "non-transitory, computer-readable medium" includes, but is not limited to portable or fixed storage devices, optical storage devices, and various other mediums capable of storing instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Additionally, for the purposes of illustration, methods may have been described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Although the disclosure has been described with respect to specific embodiments, it will be appreciated that the disclosure is intended to cover all modifications and equivalents within the scope of the following claims.

What is claimed is:

1. A system for motion capture, comprising:
a first set of one or more cameras operable to capture first light at wavelengths in a first spectrum, the first set of one or more cameras positioned around a performance area to capture a first series of images of an actor during a performance by the actor in the performance area;

a plurality of markers applied to a face of the actor, wherein the plurality of markers includes a first reflective element having a first diameter and a second reflective element having a second diameter different in length from the first diameter;

one or more light sources configured to emit first light at wavelengths in the first spectrum to illuminate at least a portion of the actor during the performance with the first light; and a second set of one or more cameras operable to capture light at wavelengths in a second spectrum different from the first spectrum, the second set of one or more cameras positioned around the performance area to capture a second series of images comprising an appearance of the actor without the plurality of markers during the performance simultaneously with the first set of one or more cameras so that the first set and the second set of one or more cameras are configured to capture images of the performance at a same time, wherein the first set of one or more cameras are configured to capture movement of the plurality of markers applied to the face of the actor during the performance by capturing the first light reflected off of markers on a head of the actor from at least two perspectives, and wherein the plurality of markers are gel-based retroreflective markers that are configured to reflect the first light but not reflect second light.

2. The system of claim 1, wherein the second set of one or more cameras are further configured to capture portions of the performance area around the actor during the performance to provide context for the performance.

3. The system of claim 1, wherein the first spectrum is within an infrared light spectrum range and the second spectrum is within a visible light spectrum range such that the first spectrum and second spectrum do not overlap.

4. The system of claim 1, wherein each camera of the first set of the one or more cameras are positioned in different positions around the performance area and directed at the performance area to capture movements of the actor during the performance.

5. The system of claim 1, wherein the first set and the second set of one or more cameras are mounted on a single support frame of a movable rig.

6. The system of claim 5, wherein the second set of one or more cameras includes a taking camera and the first set of one or more cameras includes a first witness camera and a second witness camera positioned on laterally opposite sides of the taking camera.

7. The system of claim 5, wherein each light source of the one or more light sources is formed as a ring of lights positioned around a lens of a respective camera of the first set of one or more cameras.

8. The system of claim 1, wherein the first set and the second set of the one or more cameras are positioned around the performance area as standalone cameras that are mounted on stands.

9. A system for motion capture, comprising:

a set of one or more witness cameras positioned on stands that holds the set of one or more witness cameras in an elevated positioned around a performance area to capture a first series of images of an actor during a performance by the actor in the performance area, the set of one or more witness cameras being operable to capture first light at wavelengths in a first spectrum;

a plurality of markers applied to a face of the actor, wherein the plurality of markers includes a first reflective element having a first diameter and a second reflective element having a second diameter different in length from the first diameter;

one or more light sources positioned around the performance area and configured to emit first light at wavelengths in the first spectrum to illuminate at least a portion of the actor during the performance with the first light; and a taking camera operable to capture light at wavelengths in a second spectrum different from the first spectrum, the taking camera positioned around the performance area to capture a second series of images comprising an appearance of the actor without the plurality of markers during the performance simultaneously with the first set of the one or more witness cameras so that the taking camera and the set of one or more witness cameras are configured to capture images of the performance at a same time, wherein the first set of the one or more witness cameras are configured to capture movement of the plurality of markers applied to the face of the actor during the performance by capturing the first light reflected off of markers on a head of the actor from at least two perspectives, and wherein the plurality of markers are gel-based retroreflective markers that are configured to reflect the first light but not reflect second light.

10. The system of claim 9, wherein the second set of the one or more witness cameras are further configured to capture portions of the performance area around the actor during the performance to provide context for the performance.

11. The system of claim 9, wherein the first spectrum is within an infrared light spectrum range and the second spectrum is within a visible light spectrum range such that the first spectrum and second spectrum do not overlap.

* * * * *